US012521717B2

(12) United States Patent
Garstecki et al.

(10) Patent No.: US 12,521,717 B2
(45) Date of Patent: Jan. 13, 2026

(54) MICROFLUIDIC CHIP, PRODUCTION PROCESS AND USES

(71) Applicant: CURIOSITY DIAGNOSTICS SP. Z O.O., Warsaw (PL)

(72) Inventors: Piotr Garstecki, Warsaw (PL); Kamil Robert Gewartowski, Warsaw (PL); Piotr Knap, Hrubieszow (PL); Maciej Lirski, Warsaw (PL)

(73) Assignee: CURIOSITY DIAGNOSTICS SP. Z O.O., Warsaw (PL)

(*) Notice: Subject to any disclaimer, the term of this patent is extended or adjusted under 35 U.S.C. 154(b) by 804 days.

(21) Appl. No.: 17/626,445

(22) PCT Filed: Jul. 13, 2020

(86) PCT No.: PCT/EP2020/069761
§ 371 (c)(1),
(2) Date: Jan. 11, 2022

(87) PCT Pub. No.: WO2021/009124
PCT Pub. Date: Jan. 21, 2021

(65) Prior Publication Data

US 2022/0241787 A1 Aug. 4, 2022

(30) Foreign Application Priority Data

Jul. 12, 2019 (EP) .................................... 19186116

(51) Int. Cl.
*B01L 3/00* (2006.01)

(52) U.S. Cl.
CPC ... *B01L 3/502753* (2013.01); *B01L 2200/027* (2013.01); *B01L 2200/0636* (2013.01);
(Continued)

(58) Field of Classification Search
CPC ............ B01L 3/502753; B01L 3/5027; B01L 2300/10; B01L 2200/0636;
(Continued)

(56) References Cited

U.S. PATENT DOCUMENTS 7,214,320 B1 5/2007 Gregori et al. ........ B01D 15/08
7,217,878 B2 * 5/2007 Ludwig .................... G10H 3/18 84/622

(Continued)

FOREIGN PATENT DOCUMENTS

CN 106190774 12/2016 ............. C12M 1/00
CN 206244793 6/2017 ............. C12M 1/31

(Continued)

OTHER PUBLICATIONS

European Search Report issued in EP Patent Appln. Serial No. 19186116.0-1101, dated Sep. 18, 2019, 11 pages.

(Continued)

*Primary Examiner* — Shogo Sasaki
(74) *Attorney, Agent, or Firm* — HAYES SOLOWAY P.C.

(57) ABSTRACT

A microfluidic chip for partitioning a liquid composition into multiple aliquots has a processing compartment including an inlet and an outlet, wherein the outlet of the processing compartment is connected either to an inlet of the compression compartment or wherein in case a compression channel is present, the outlet of the processing compartment is connected to the compression channel, which is connected to the inlet of the compression compartment, preferably wherein each of the compression compartments exhibits the same volume.

20 Claims, 11 Drawing Sheets

(52) U.S. Cl.
CPC ... *B01L 2200/12* (2013.01); *B01L 2300/0829* (2013.01); *B01L 2300/0864* (2013.01); *B01L 2300/10* (2013.01); *B01L 2300/168* (2013.01)

(58) Field of Classification Search
CPC ......... B01L 2300/0864; B01L 2200/12; B01L 2300/0874; B01L 2300/168; B01L 2200/0605; B01L 2200/0621; B01L 2300/0829; B01L 2200/027
See application file for complete search history.

(56) References Cited

U.S. PATENT DOCUMENTS

| | | | | |
|---|---|---|---|---|
| 8,025,853 | B2 * | 9/2011 | Numajiri | G01N 35/08 422/503 |
| 8,396,701 | B2 * | 3/2013 | Ludwig | G06F 30/20 703/1 |
| 8,480,974 | B2 * | 7/2013 | Rapp | B01L 3/502738 422/537 |
| 2002/0187072 | A1 | 12/2002 | Karp | 422/60 |
| 2005/0180880 | A1 * | 8/2005 | Itoh | B01L 3/5027 435/288.5 |
| 2008/0069739 | A1 * | 3/2008 | Ludwig | B01J 19/0093 422/50 |
| 2010/0240051 | A1 | 9/2010 | Wang et al. | 435/6 |
| 2012/0022693 | A1 * | 1/2012 | Ludwig | G05D 7/0694 700/282 |
| 2017/0259267 | A1 * | 9/2017 | Kim | F04B 43/12 |
| 2020/0150142 | A1 * | 5/2020 | Hui | B01L 3/0265 |

FOREIGN PATENT DOCUMENTS

| | | | |
|---|---|---|---|
| CN | 108579829 | 9/2018 | B01L 3/00 |
| CN | 109289951 | 2/2019 | B01L 3/00 |
| EP | 2 388 074 | 11/2011 | B01L 3/00 |
| KR | 10-1619167 | 5/2016 | G01N 33/50 |
| WO | WO2017167973 | 10/2017 | G01N 33/543 |

OTHER PUBLICATIONS

International Preliminary Report on Patentability issued in PCT/EP2020/069761, dated Oct. 20, 2021, 24 pages.
International Search Report and Written Opinion issued in PCT/EP2020/069761, dated Oct. 13, 2020, 15 pages.

* cited by examiner

MICROFLUIDIC CHIP, PRODUCTION PROCESS AND USES

TECHNICAL FIELD

The present invention relates to a microfluidic chip for partitioning a liquid composition into multiple aliquots, production processes and uses thereof according to the independent claims.

BACKGROUND ART

The field of microfluidic technology is advancing in providing solutions for partitioning and processing multiple aliquots of a liquid composition, such as for conducting a chemical synthesis and/or chemical, biochemical and/or proteomic analysis, more preferably for conducting a biochemical assay selected from the group consisting of an enzymatic analysis, such as a glucose or a lactate assay; a DNA analysis, such as a polymerase chain reaction (PCR) and in particular a PCR with high-throughput sequencing.

Such solutions relate to so called microfluidic devices, such as microfluidic chips comprising a microfluidic network with multiple compartments for automated partitioning the liquid composition into aliquots and processing of the respective aliquots in the multiple compartments.

In order to reduce time and costs, and increase throughput parallel processing of the multiple aliquots of liquid composition is preferred. Thus, there exists a need to increase the number of compartments so that a higher number of aliquots of the liquid composition can be partitioned and processed, preferably in parallel. Furthermore, there exists a need to increase the number of compartments per area, i.e. increase density of packaging of the compartments. In this case, a higher number of compartments may be arranged in a microfluidic device/microfluidic chip of convenient size, preferably a conventional size, such as the size of a microplate (microwell plate), e.g. length 127.76 mm±0.5 mm and width 85.48 mm±0.5 mm, so that conventional manufacture, storage and processing means may still be used. This in turn, leads to further reduced manufacturing and processing costs calculated per compartment.

The technical field of microfluidic devices provides several solutions to increase the number of compartments per microfluidic device, such as branching a microfluidic channel in two sub-channels, wherein the sub-channels are respectively connected to a partitioning and processing compartment. In order to further increase the number of compartments, it has been suggested to additionally use serial arrangement of multiple compartments, wherein the serially arranged/stringed compartments are filled subsequently with the liquid composition.

In practice, it has been found that the serial arrangement of compartments can unfortunately lead to an uneven filling of the compartments, i.e. the compartments most proximal to the liquid composition reservoir may be completely filled, but the compartments most distal may comprise less liquid composition. This is disadvantage in particular relevant, in case an unvented microfluidic network is used for reducing the risk of contamination with the environment.

But even if respective air traps of suitable sizes per serial arrangement of compartments are provided as solution in unvented microfluidic network and complete filling of all serially arranged compartments may thus be achieved, the serial arrangement shows another disadvantage, as the serially arranged compartments are only filled subsequently, which means that parallel processing of the multiple aliquots of liquid composition can only start after the last one has been filled.

Moreover, it has been found in practice that only for those liquid compositions to be partitioned, which comprise only one constituent or which comprise a homogeneous mixture of two or more constituents, the serially arranged compartments seem to exhibit aliquots of the liquid composition with the same constitution.

However, in case of conducting a chemical synthesis and/or chemical, biochemical and/or proteomic analysis it is rarely the case that the liquid to be partitioned only consists of a single constituent. For example, when conducting a PCR analysis, the liquid composition to be partitioned generally comprises a carrier liquid for transporting the isolated nucleic acid. Thus, in order to achieve the same constitution in the aliquots of the liquid homogenizing means have to be applied in order to partition a homogeneous mixture of the liquid composition.

Such an additional preprocessing step, however, increases production and processing time and costs.

Thus, there exists an ongoing need to reduce time and costs for partitioning and processing multiple aliquots of liquid composition by

- increasing the number of compartments for partitioning a liquid composition of a suitable microfluidic chip, and/or
- increasing the number of compartments for partitioning a liquid composition per surface area and/or volume of a microfluidic chip and/or
- facilitating equal partitioning, i.e. wherein the partitioned multiple aliquots respectively exhibit the same volume and more preferably exhibit the same constitution.

Furthermore, there exists an ongoing need in providing simple and cost effective production processes for such an improved microfluidic chip.

Thus, it is an aim of the present invention to provide an alternative and/or improved microfluidic chip for partitioning of a liquid composition, preferably wherein

- the number of compartments for partitioning a liquid composition of a suitable microfluidic chip is increased, and/or
- the number of compartments for partitioning a liquid composition per surface area and/or volume of a microfluidic chip is increased and/or
- equal partitioning is facilitated, i.e. wherein the partitioned multiple aliquots respectively exhibit the same volume and more preferably exhibit the same constitution, wherein the production processes of the microfluidic chip is preferably simple and cost effective.

SUMMARY OF THE INVENTION

One or more problems of the present invention is/are solved by the subject matter of the independent claims, namely microfluidic chip for partitioning a liquid composition into multiple aliquots, production processes and uses thereof. Advantages (preferred embodiments) are set out in the detailed description hereinafter and/or the accompanying figures as well as in the dependent claims.

Accordingly, a first aspect of the present invention relates to a microfluidic chip for partitioning a liquid composition into multiple aliquots. The microfluidic chip comprises or consists of a substrate with a fluid inlet port, which is connectable to a reservoir comprising the liquid composition, and an unvented microfluidic network connected to the fluid inlet port. The microfluidic network comprises a microfluidic channel, which is branched at a first junction $J_i$ with i=1 into two or more downstream sub-channels of a corresponding first generation $CG_i$ with i=1. Each of the two or more downstream sub-channels of the first generation can independently from each other be subsequently branched at a second or further subsequent one or more junctions $J_i$ with i=2, 3 or more into two or more downstream sub-channels of a corresponding second or subsequent further generation $CG_i$ with i=2, 3 or more. Each of the downstream sub-channels of the respective last generation $CG_L$ is connected to an inlet of a dead-end well compartment for processing the aliquot of the liquid composition in operation. At a given junction $J_g$ each of the directly connected downstream sub-channels of the corresponding given generation $CG_g$ together with its subsequent downstream sub-channels of subsequent further generations $CG_i$ with i=g+1 or more if present and its respectively connected one or more dead-end well compartments form a respective downstream microfluidic network sub-part of the corresponding given generation $MNsub_g$ with a respective volume $VMNsub_g$.

According to the first inventive aspect the microfluidic channel is branched at least at one of the junctions $J_i$ into three or more downstream sub-channels of the corresponding generation $CG_i$. Such a partitioning in particular facilitates increasing the number of compartments, preferably increasing the number of compartments per area.

Furthermore, the microfluidic channel according to the first inventive aspect requires that the microfluidic network is configured in such a way that at each of the one or more junctions $J_i$ i) the respective volume $VMNsub_g$ of each downstream microfluidic network sub-part of the same given generation $MNsub_g$ is directly proportional ±5 Vol. % to the total number of dead-end well compartments comprised in the respective downstream microfluidic network sub-part, and ii) the intersection angle $\alpha_g$ in a plane between the microfluidic channel connecting upstream to a given junction $J_g$ and a connected sub-channel of the corresponding given generation $CG_g$ is the same ±5° for each sub-channel of the corresponding given generation $CG_g$, wherein for different junctions $J_i$ the intersection angle $\alpha_i$ can be different.

It has been found in practice, that this inventive requirement in particular facilitates partitioning of the liquid composition into multiple aliquots, wherein the aliquots of liquid respectively exhibit the same volume and constitution, wherein insignificant deviations, such as ±5% in volume and constitution, are encompassed, which may result in particular due to imperfections/imprecisions of the production process of the inventive microfluidic chip.

In contrast to the present invention, the prior-art solutions relating to open-ended or vented microfluidic networks for partitioning a liquid, show that even the smallest imprecisions of manufacture can lead to significant differences between the volumes of respective aliquots. This is presently attributed to the fact that a liquid flows along the line of least resistance and, thus, preferably flows along the channel having the biggest cross-section and the smallest length, which accordingly results in a greater volume of liquid in the respective sub-part of the microfluidic network of the prior art.

The present inventive microfluidic chip, however, counteracts such an unequal liquid flow by using the unvented microfluidic network and, thus, building-up overpressure pressure within the respective sub-parts of the microfluidic network during the course of liquid flow in operation. The overpressure at a given junction $J_g$ is a function of the compressed gas in the given sub-part of the microfluidic network MNsubg. In other words, the liquid composition is faced with the respective overpressure at its interface with the respective gas portion of the connected sub-part of the microfluidic network. Accordingly, even in case at a given junction the respective sub-channels $CG_g$ may differ in their cross section areas, the inventive microfluidic chip facilitates an even liquid distribution, as the sub-channel $CG_g$ having a greater cross-sectional area correlates with a greater back-pressure in the corresponding given microfluidic network sub-part, which decreases the "usual" fluidic flow into this sub-channel in comparison to the vented solutions of the prior art. Accordingly, the tendency of pressures to equalize across the microfluidic network provides for a feedback mechanism that equalizes the volumes of respective aliquots. Therefore, even though the suitable tolerances/deviations for the dimensions perpendicular to the direction of flow of the microfluidic channel and its sub-channels are approximately up to ±10% for the smallest sub-channels and dead-end well compartments, the deviation of volumes of respective aliquots is reduced below observable levels.

In the context of the present invention, the expression "unvented microfluidic network" means that the microfluidic network used for the present invention is only connected to the environment via the inlet port and remains unvented from the inlet port to each of the dead-end well compartments under operation of the microfluidic chip and maintains being unvented when operating the microfluidic chip. In other words, the microfluidic network generally does not comprise any other outlet or venting means for connection with the environment, or only comprises outlet or venting means for connection with the environment, which are closable during operation. In general, the inventive microfluidic chip is manufactured of suitable liquid and gas impermeable material. Preferred embodiments of suitable materials are disclosed in the detailed description of the present application. Furthermore, the microfluidic chip is generally configured in such a way that the microfluidic network withstands any overpressure inside the microfluidic network, which results from operation of the microfluidic chip. In other words, the microfluidic chip is generally configured to withstand the overpressure inside the microfluidic network without substrate material parts of the microfluidic chip breaking, cracking, detaching etc. As an example, the inventive microfluidic chip comprises a microfluidic network, which remains unvented during operation for resulting overpressure within the microfluidic network of up to 10 bar. This means that under operation, i.e. flow of the liquid composition into the dead-end well compartments and resulting overpressure of up to 10 bar, the inventive microfluidic chip can sustain the overpressure and prevent the release of any gas and liquids for at least 15 minutes, preferably for at least 30 minutes.

In the context of the present invention, the expression "the respective volume $VMNsub_g$ of each downstream microfluidic network sub-part of the same given generation $MNsub_g$ is directly proportional to the total number of dead-end well compartments comprised in the respective downstream microfluidic network sub-part" means that also an insignificant deviation of ±5 Vol. % relating to the direct proportionality is encompassed, which may be in particular due to imperfections/imprecisions of the production process of the inventive microfluidic chip.

In the context of the present invention, the expression "the intersection angle $\alpha_g$ in a plane between the microfluidic channel connecting upstream to a given junction $J_g$ and a connected sub-channel of the corresponding given generation $CG_g$ is the same ±5° for each sub-channel of the corresponding given generation $CG_g$" means that an insignificant deviation of ±5° of the same angle $\alpha_g$ is encompassed, which may be in particular due to imperfections/imprecisions of the production process of the inventive microfluidic chip. In general, for upstream and downstream channels having an axis of symmetry, the intersection angle $\alpha_g$ is measured in the plane between the axis of the channel connecting upstream to a given junction $J_g$ and the axis of the connected sub-channel of the corresponding given generation $CG_g$. In addition, in case the channel connecting upstream to a given junction $J_g$ and/or the connected sub-channel of the corresponding given generation $CG_g$ do not exhibit an axes of symmetry, the intersection angle $\alpha_g$ is measured between the direction of flow in the channel connecting upstream to a given junction $J_g$ and the connected sub-channel of the corresponding given generation $CG_g$, wherein the direction of flow is deemed to be a laminar flow and excludes insignificant turbulences.

According to a second aspect of the present invention, a simple and cost effective process for producing the inventive microfluidic chip according to the first aspect is provided. The inventive production process according to the second aspect comprises or consists of the following steps:

a) producing a basic substrate having in parallel an upper and a lower surface comprising a microfluidic network as defined with respect to the first inventive aspect comprising at least a given junction $J_g$, where the microfluidic channel is branched in three or more downstream sub-channels of a the corresponding given generation $CG_g$,
   i. arranging each of the downstream sub-channels of the given generation $CG_g$ respectively as a recess either in the upper or the lower surface of the basic substrate,
   ii. arranging the microfluidic channel connecting upstream to the given junction $J_g$ as a through-hole perpendicular to the upper and lower surfaces of the basic substrate and connecting it at the given junction $J_g$ to each of the downstream sub-channels of the given generation $CG_g$, and
b) coating the upper and lower surfaces of the basic substrate of step a) at least in the surface area comprising the downstream sub-channels of the given generation $CG_g$ and the microfluidic channel connecting upstream to the given junction $J_g$ with a coating material thereby forming an unvented microfluidic network of the microfluidic chip.

According to the third aspect of the present invention, a use of the microfluidic chip according to first inventive aspect or a microfluidic chip obtainable according to the second inventive aspect is provided for partitioning a liquid composition into multiple aliquots having the same volume and constitution and processing the aliquots.

The inventive aspects of the present invention as disclosed hereinbefore can comprise any possible (sub-)combination of the preferred inventive embodiments as set out in the dependent claims or as disclosed in the following detailed description and/or in the accompanying figures, provided the resulting combination of features is reasonable to a person skilled in the art.

BRIEF DESCRIPTION OF THE DRAWINGS

Further characteristics and advantages of the present invention will ensue from the accompanying drawings, wherein.

DETAILED DESCRIPTION OF THE INVENTION

Figure 1A:
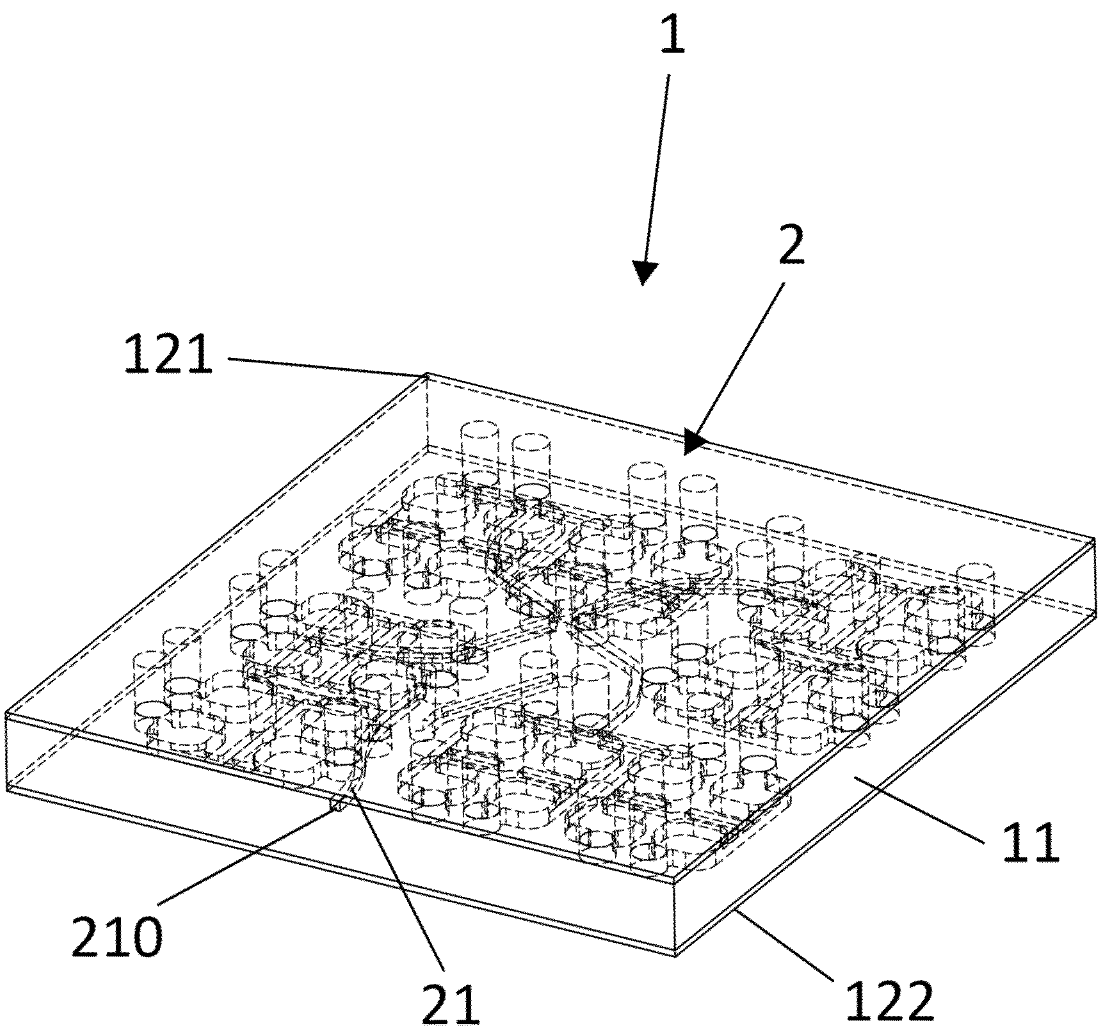
FIG. 1A represents a simplified perspective top view of an inventive microfluidic chip.

As set out in more detail hereinafter, the inventors of the different aspects of the present invention have found out that the inventive microfluidic chip facilitates increasing the number of dead-end well compartments and, thus, the number of partitioned aliquots of liquid compositions in a microfluidic chip, preferably wherein the number of dead-end well compartments is increased per surface area and/or volume of the microfluidic chip.

It is shown below, that the inventive microfluidic chip can in particular obtain an increase in number of dead-end well compartments per surface area, wherein the dead end well compartments have a percentage of approximately 35% or less, in particular 28.5% or less per surface area of the inventive microfluidic chip. Calculated on the volume of the microfluidic chip, the dead-end well compartments show a percentage of approximately 13% or less, preferably approximately 7% in relation to the volume of the inventive microfluidic chip. Such an arrangement is in particular suitable for conducting PCR analysis.

This advantage in particular correlates on the one hand with branching of a microfluidic channel in three or more sub-channels and on the other hand with the requirements for the volume $VMNsub_g$ of the respective downstream microfluidic network sub-part of the corresponding given generation $MNsub_g$ and with the requirements for the intersection angle α.

At the same time, the inventive microfluidic chip facilitates partitioning the liquid composition into multiple aliquots each having the same volume and constitution, wherein insignificant deviations in volume and constitutions due to manufacturing imperfections are encompassed.

Surprisingly, the inventive microfluidic chip also facilitates partitioning of the liquid composition into multiple aliquots having the same volume and constitution in case the liquid composition comprised in the reservoir is not homogeneously mixed, i.e. in particular exhibits a concentration gradient of its constituents over the length of the reservoir compartment. In turn, this advantage allows to further simplify partitioning of a liquid composition, which comprises more than one constituent, as the liquid composition does not need to be homogenized prior to partitioning. Such a simplified handling also further reduces processing time and costs. This advantages in particular relates to the inventive configuration of a microfluidic network in such a way that at each of the one or more junctions $J_i$ i) the respective volume VMNsubg of each downstream microfluidic network sub-part of the same given generation MNsubg is directly proportional to the total number of dead-end well compartments comprised in the respective downstream microfluidic network sub-part, and ii) the intersection angle $\alpha_g$ between the microfluidic channel connecting upstream to a given junction $J_g$ and a connected sub-channel of the corresponding given generation $CG_g$ is the same ±5° for each sub-channel of the corresponding given generation $CG_g$, wherein for different junctions $J_i$ the intersection angle $\alpha_i$ can be different.

In other words, in case a microfluidic network comprised in a microfluidic chip comprises a junction wherein a microfluidic channel is branched in three or more sub-channels without fulfilling the above mentioned inventive characteristics of items i) and ii), the partitioning of the liquid composition will not result in an equal partitioning of the liquid composition, which means that the aliquots of the liquid composition will significantly differ in volume and/or constitution of the liquid composition. This behavior has been identified by the present inventors and is presently attributed to a change of liquid flow in particular due to different intersection angles $\alpha_g$ at a given junction $J_g$ for each of the connected sub-channels of the corresponding given generation $CG_g$. In other words, the resistance to flow of the liquid composition seems—in addition to other factors, such as geometric and surface properties of the microfluidic channel in the flow direction—to be particularly affected by the intersection angle α at junctions $J_i$ throughout a flow path. A flow path describes the microfluidic path of the liquid composition when flowing from the inlet port to a given dead-end well compartment and, thus, comprises the respective parts of the microfluidic channel including its potential sub-channels and the given dead-end well compartment.

Whereas such an unequal filling might be tolerated for some procedures of the aliquot of liquid composition, such as for conducting qualitative analysis, an unequal partitioning might not be tolerable for other procedures of the aliquot of liquid composition, such as for quantitative analysis. Accordingly, the inventive microfluidic chip is in particular beneficial as it is also applicable when conducting procedures requiring a high precision regarding the volume and/or constitution of the partitioned aliquot of liquid composition.

As an example for requirement i) comprised by the present invention, in case the microfluidic channel connecting upstream a given junction is connected to three downstream sub-channels of the same given generation each respectively connecting to the same number of dead-end well compartments, the respective volume VMNsubg of each of the three downstream microfluidic network sub-parts of the same given generation MNsubg is the same.

As alternative example for requirement i) also encompassed by the present invention, the microfluidic channel connecting upstream a given junction is connected to two downstream sub-channels of the same given generation each respectively connecting to a different number of dead-end well compartments, such as one of the sub-channels of the same given generation $CG_g$ connects via further subsequent sub-channels of a further generation $CG_{g+1}$ to three dead-end well compartments and the other sub-channel of the same given generation $CG_g$ connects via further subsequent sub-channels of further generations $CG_{g+1}$ and $CG_{g+2}$ to four dead-end well compartments. In this case, the respective volume VMNsubg of the microfluidic network sub-part of the same given generation MNsubg comprising three dead-end well compartments is ¾ of the VMNsubg of the microfluidic network sub-part of the same given generation MNsubg comprising four dead-end well compartments.

With respect to item ii) the intersecting angle α between the microfluidic channel connecting upstream to a given junction $J_g$ and each of the respectively connected downstream sub-channels of the same given generation $CG_g$ are the same ±5°, wherein the deviation of ±5° is regarded as insignificant. As a preferred embodiment thereof, the intersection angle $\alpha_i$ is <180°, more preferably =90°±5. Generally, intersection angle $\alpha_i$ can independently be selected for different junctions $J_i$. However, it is preferable that at the junctions $J_i$ of the same order the intersection angle $\alpha_i$ is the same including deviations, preferably wherein at all junctions $J_i$ the intersection angle $\alpha_i$ is the same including deviations, more preferably, wherein the intersection angle $\alpha_i$ is 90°±5°.

In the context of the present invention, the expression "junctions $J_i$ of the same order" means respective junctions of the same generation in each of the flow paths of the microfluidic network. Accordingly, as the first junction is common to all flow paths, there is only one junction of the first order. As an example, in case the microfluidic junction is branched at the first junction $J_1$ into four sub-channels $CG_1$, which are subsequently respectively branched at a second junction $J_2$ into two sub-channels $CG_2$, there are four junctions $J_2$ of second generation and, thus, same order.

In summary, both the volume requirement of item i) and the intersection angle α requirements of item ii) facilitate equal filling of each of the dead-end wells with aliquots of the liquid composition having the same volume and constituents in particular in case the liquid composition exhibits a concentration gradient.

According to an additionally or alternatively further preferred embodiment of the first aspect of the present invention, each of the downstream sub-channels $CG_g$ independently of each other exhibits a hydraulic diameter D, defined as D=4A/p, where A is the cross-sectional area of the sub-channel and p is the cross-section perimeter, of 600 μm or less, preferably in the range of 500 μm to 100 μm, more preferably 300 μm to 150 μm, and a fluidic distance in the direction of flow between two consecutive given junctions $J_g$ and $J_{g+1}$ of at least three times the hydraulic diameter, preferably in the range of five times the hydraulic diameter to twenty five times the hydraulic diameter, most preferably ten times the hydraulic diameter to twenty five times the hydraulic diameter.

In other words, the relationship applies to the hydraulic diameter and the fluidic distance in the direction of flow between two consecutive given junctions $J_g$ and $J_{g+1}$ of the same sub-channel $CG_g$. The hydraulic diameter is usually defined as a function of the cross-sectional area of a channel and its wetted perimeter. In the context of the present invention, complete wetting of the entire perimeter of channel's cross-section is assumed. Therefore, the wetted perimeter is represented by the perimeter of the channel's cross-section. Thus, in the case of a channel with circular cross-section, D equals the geometrical diameter of the circular cross-section. In the case of a channel with square cross-section, D equals the side of the square cross section. The hydraulic diameters for other cross-sections can be calculated accordingly. In this context, the cross-section is the cross-section perpendicular to the overall direction of flow, e.g. perpendicular to the longitudinal axis of symmetry of the channel, if the channel exhibits such an axis. Preferably, the hydraulic diameter for the sub-channels $CG_g$ connecting to the same junction $J_g$ is the same. This preferred embodiment further assists to partition a liquid composition, which exhibits changes of concentration of one or more constituents along the length of the microfluidic channel, into aliquots having the same constitution.

In the context of the present invention, the expression "an additionally or alternatively further preferred embodiment" or "an additionally or alternatively preferred embodiment" or "an additional or alternative way of configuring this preferred embodiment" means that the feature or feature combination disclosed in this preferred embodiment can be combined in addition to or alternatively to the features of the inventive subject matter including any preferred embodiment of each of the inventive aspects, provided the resulting feature combination is reasonable to a person skilled in the art.

According to an additionally or alternatively preferred embodiment of the first aspect of the present invention, the two or more sub-channels of the corresponding given generation $CG_g$ connecting to a given junction $J_g$ are arranged within the microfluidic chip in a plane parallel to either an upper or a lower surface of the microfluidic chip and at least the part of the microfluidic channel connecting upstream to the given junction $J_g$ is arranged within the microfluidic chip perpendicular to the plane of the sub-channels of the corresponding given generation $CG_g$. This embodiment is in particular preferred, in case the microfluidic channel connecting upstream to the given junction $J_g$ and arranged perpendicular to the plane of the sub-channels of the corresponding given generation $CG_g$ bends further upstream at a section S into a plane parallel to and spaced from the plane of the sub-channels of the corresponding given generation $CG_g$. Both preferred embodiments as set out hereinbefore contribute in particular to increase the number of dead-end well compartments per surface area, i.e. facilitating dense packaging of the dead-end well compartments.

As an example, the first inventive aspect facilitates a comparatively highly dense packaging, i.e. the arrangement of, e.g., 32 dead-end well compartments each having a cross section surface area of approximately 4.37 $mm^2$, thus, a total of approximately 140 $mm^2$ in the plane parallel to either an upper or a lower surface of the microfluidic chip per surface area of 400 $mm^2$ (2 cm×2 cm). Thus, the dead end well compartments have a percentage of approximately 35% or less per surface area of the inventive microfluidic chip. Calculated on the volume of the microfluidic chip (900 $mm^3$), the 32 dead-end well compartments (107 $mm^3$) show a percentage of approximately 13% or less in relation to the volume of the inventive microfluidic chip. Such an arrangement is in particular suitable for conducting PCR analysis.

In view of the present manufacturing proceedings, in particular relating to injection molding, the unvented microfluidic network is preferably incorporated into the inventive microfluidic chip in such a way that the substrate exhibits at least a wall thickness of 0.6 μm around the microfluidic network. This wall thickness requirement relates to the injection molding limitations. Presently, a smaller wall thickness could result in an incomplete substrate wall. However, this wall thickness limitation may change in view of advancing injection molding techniques or in view of using other manufacturing processes.

According to an additionally or alternatively preferred embodiment of the first aspect of the present invention, the dense packaging of dead-end well compartments in the inventive microfluidic chip can furthermore be improved by configuring the microfluidic channel in such a way that it is arranged to change at one or more sections $S_i$ with i=1, 2 or more its arrangement from the upper to the lower plane parallel to the surface of the microfluidic chip or vice versa without branching the microfluidic channel into two or more sub-channels. The sections $S_i$ are preferably respectively configured as a section connection channel $SC_i$ arranged perpendicular to the upper and lower planes of the microfluidic chip connecting the microfluidic channel in the plane parallel to upper and lower surface of the microfluidic channel. This preferred feature additionally facilitates to increase number of dead-end well compartments per surface area and/or volume of the inventive microfluidic chip.

According to another additionally or alternatively preferred embodiment of the first aspect of the present invention, the microfluidic network comprises gas, which will be compressed during operation of the microfluidic chip, and wherein each of the multiple dead-end well compartments comprises a processing compartment, a compression compartment, and optionally a compression channel, wherein the inlet of the dead-end well compartment forms the inlet of the processing compartment connected to the downstream sub-channel of the respective last generation $CG_L$, wherein the processing compartment further comprises an outlet, which is connected either to an inlet of the compression compartment, or wherein in case the compression channel is present, the outlet of the processing compartment is connected to the compression channel, which is connected to the inlet of the compression compartment, preferably wherein each of the compression compartments exhibits the same volume.

This preferred embodiment further assists optimized filling of the dead-end well compartments and at the same time facilitates reducing amount of air within the processing compartment, which might be relevant for the processing step and also reducing overpressure, which results in the unvented microfluidic network during operation of the microfluidic chip.

The inventive microfluidic chip can facilitate an arrangement of processing compartments having a percentage of approximately 28.5% or less per surface area of the inventive microfluidic chip. Calculated on the volume of the microfluidic chip, the dead-end well compartments show a percentage of approximately 7% in relation to the volume of the inventive microfluidic chip. Such an arrangement is in particular suitable for conducting PCR analysis.

An additional or alternative preferred embodiment of the first inventive aspect relates to an inventive microfluidic chip, wherein the inlet and the outlet of the processing compartment are configured in such a way that when operating the microfluidic chip the processing compartment can be entirely filled with the aliquot of liquid composition and wherein the compression compartment is configured to encase the respective compressed gas portion.

One way of configuring this preferred embodiment of the dead-end well compartment is to configure the volume of each of the compression compartments, preferably the sum of volumes of compression compartment and compression channel in such a way that it equals to or is bigger than the total volume of gas comprised in the unvented microfluidic network under the operating pressure of filling of the processing compartments, divided by the number of compression compartments in that network. The volume of the compression channel may serve as a buffer for accommodating fluctuations of operating pressure. Such a volume configuration of the compression compartment, preferably the compression channel and the compression compartment in particular reduces the risk of residual gas bubbles in the filled processing compartment prior to processing and, thus, optimizes further processing of the aliquot of liquid composition.

An additional or alternative way of configuring this preferred embodiment of the dead-end well compartment is to configure the dimension of the processing compartment in the direction of flow, i.e. along the line connecting the inlet to the outlet of the processing compartment, as equal to or bigger than the largest characteristic dimension in the plane perpendicular to the direction of flow. Stated differently, the inlet and outlet of the processing compartment should exhibit the longest distance within the processing compartment. Such a dimensional/distance configuration between inlet and outlet also reduces the risk of residual gas bubbles in the filled processing compartment prior to processing and, thus, optimizes further processing of the aliquot of liquid composition.

An additional or alternative way of configuring this preferred embodiment of the dead-end well compartment is to configure all dead-end well compartments, preferably all processing compartments, at least in direction of flow, i.e. in the plane of the lower surface of the microfluidic chip as a compartment with rounded corners, such as a round cornered processing compartment, or alternatively as a round compartment, such as a compression compartment with round cross section in plane of the lower surface of the microfluidic chip. Preferably, the radius of each of the rounded corners of the processing compartments is equal to or bigger than 100 μm. Such round/rounded configuration also in particular minimizes the risk of residual gas bubbles in the filled processing compartment prior to processing and, thus, optimized further processing of the aliquot of liquid composition.

According to an additional or alternative preferred embodiment of the first aspect of the present invention, the compression compartment is configured to not interfere with processing of the liquid composition in the processing compartment when operating the microfluidic chip. One way of configuring this preferred embodiment is to arrange the compression channel and compression compartment outside the processing direction, in particular inspection direction. This embodiment is preferably configured by arranging the inlet and outlet of the processing compartment at the longest distance in the direction of flow in plane of the lower surface of the inventive microfluidic chip.

According to an additional or alternative preferred embodiment of the first aspect of the present invention, a part of the inner surface of the processing compartment comprises a matte surface structure configured to attach an applied agent and configured to be in contact with the aliquot liquid composition when in operation, more preferably wherein the matte surface structure is arranged in central position of the surface so that at least the surface area around the inlet and outlet of the processing compartment does not comprise the matte surface structure. This preferred embodiment reduces the risk that the applied agent, such as one or more primers for conducting PCR assays, is transferred by capillary forces of the inlet and/or outlet out of the processing compartment.

As already set out above, the substrate material of the microfluidic chip is generally suitable to produce the unvented microfluidic network of the present invention, i.e. is generally liquid and gas impermeable during operation of the microfluidic chip. As a counter example, PDMS is not regarded suitable for producing the unvented microfluidic network of the present invention although it provides a liquid impermeable substrate, as the resulting substrate material is gas permeable. According to a preferred embodiment, the substrate material should also preferably not interfere with the processing of the aliquot of liquid in the dead-end well compartments. According to an additional or alternative preferred embodiment of the first aspect of the present invention, the substrate material facilitates in particular thermal, and optical processing of the dead-end well compartments, such as irradiation with electromagnetic waves, such as in the infrared and/or ultraviolet range and/or visible range and/or optical inspection. Accordingly, the substrate material is transparent to the respective irradiated and/or emitted wavelength, in order to reduce a negative impact on processing of the aliquot of liquid. According to an additional or alternative preferred embodiment of the first aspect of the present invention, the microfluidic chip substrate comprising the unvented microfluidic network is formed of a liquid and gas impermeable material selected from the group consisting of suitable glass and suitable polymers, wherein the polymers are preferably selected from the group consisting of polycarbonate, cyclic olefin copolymer, polystyrene, cyclic olefin polymer or poly(methyl methacrylate). More preferable, the substrate material is selected from polycarbonate.

According to an additional or alternative preferred embodiment of the first aspect of the present invention, the microfluidic chip comprises a basic substrate having in parallel an upper and a lower surface, wherein at least at a given junction $J_g$, where the microfluidic channel is branched in three or more downstream sub-channels of the given generation $CG_g$, each of the downstream sub-channels of the given generation $CG_g$ is respectively arranged as recess either in the upper or the lower surface of the basic substrate and the microfluidic channel connecting upstream to the given junction $J_g$ forms a through-hole perpendicular to the upper and lower surfaces of the basic substrate and connects at the given junction $J_g$ to each of the downstream sub-channels of the given generation $CG_g$, preferably wherein the microfluidic channel bends at a section S at the surface of the basic substrate opposite to the downstream sub-channels of the given generation $CG_g$ in such a way that it is further arranged as a recess in this surface of the basic substrate, and wherein the basic substrate is coated on the upper and lower surfaces at least in the surface area comprising the downstream sub-channels of the given generation CGg and the microfluidic channel connecting upstream to the given junction Jg with a coating material thereby forming the unvented microfluidic network of the microfluidic chip.

This preferred embodiment facilitates simple and cost effective production of the inventive microfluidic chip according to the first aspect of the present invention. The material of both the basic substrate and the coating material is preferably configured to not interfere with the processing of the aliquot of liquid composition, preferably is transparent to the respective irradiated and/or emitted wavelength, in order to reduce a negative impact on processing of the aliquot of liquid, and accordingly is advantageously selected from the preferred substrate material as set out hereinbefore. More preferably, the material for the basic substrate and the coating material is the same, in particular polycarbonate, cyclic olefin copolymer, polystyrene, cyclic olefin polymer or poly(methyl methacrylate), more preferably polycarbonate.

The surface of the recess forming the microfluidic channel when coated with the coating material exhibits generally a suitable surface end geometry for facilitating fluid flow. The following generally applies: the smoother, more hydrophobic and/or rounder, the better the flow rate. The same applies to the surface of the coating material in the area of the microfluidic channel. According to a preferred embodiment, the surface properties of the recesses forming the microfluidic channel throughout the microfluidic network is preferably essentially the same including insignificant deviations.

The coating material is generally applied in fluid tight and gas tight manner to the upper and lower surface of the basic substrate thereby forming the unvented microfluidic network, preferably is applied in form of a foil or plate, which is used in a suitable thickness in order to be bonded/sealed in gas and fluid impermeable manner to the basic substrate. The applied coating material, preferably foil or plate is generally configured to withstand the overpressure, which builds up during operation, preferably the applied coating material, preferably foil or plate maintains the unvented microfluidic network when subjected to an overpressure ≤10 bar, preferably ≤5 bar.

In order to reduce a negative impact on processing of the aliquot of liquid in the dead-end well compartments, preferably the processing compartments, the coating material is also configured to not interfere with the processing, e.g. coating material is transparent to the respective irradiated and/or emitted wavelength, in order to reduce a negative impact on processing of the aliquot of liquid, more preferably is respective transparent foil manufactured from a polymeric material as set out in more detail above.

According to an additional or alternative preferred embodiment of the first aspect of the present invention, the multiple dead-end well compartments are respectively arranged as a recess in the lower surface of the basic substrate, preferably the processing compartments and the compression channels are respectively arranged as a recess in the lower surface of the basic substrate. This preferred configuration facilitates simple and cost effective production of the inventive microfluidic chip according to the first aspect of the present invention. Moreover, the preferred configuration of arranging the processing compartments respectively as a recess in the lower surface of the basic substrate facilitates an improved processing, such as e.g. heating and/or cooling of the multiple aliquots of liquid in case a heating/cooling means is arranged in contact with the lower surface of the inventive microfluidic chip.

In order to optimize liquid flow and to reduce residual gas in the processing compartment, the processing compartment has a rounded shape, preferably a circular, oval, or angular shape with rounded corners in the plane of the lower surface of the basic substrate in bottom view. The rounder the shape, the less gas traps in particular in corners reside in the processing compartment.

According to a further preferred embodiment thereof the respective recesses of the processing compartment and the compression channel do not form through holes through the basic substrate. Such a preferred configuration is in particular advantageous for the processing compartment, as it allows attaching an agent to the basic substrate delimiting the respective recesses in upper direction, more preferably to attach the agent to a matte structured region which is arranged in central position of the recess of the processing compartment in order to concentrate the agent in the matte structured region and preventing transport of this agent through the capillary forces out of the processing compartment.

In addition or alternatively, the compression compartments respectively preferably extend perpendicular to the upper and lower surfaces of the basic substrate, more preferably wherein the compression compartments respectively form a through-hole perpendicular to the upper and lower surfaces of the basic substrate. This preferred embodiment on the one hand facilitates simple and cost effective production of the inventive microfluidic chip and on the other hand facilitates dense packaging of the dead-end well compartments, by providing a comparatively big volume for the compression compartment in relation to the surface area on the upper or lower surface of the basic substrate.

In order to further facilitate the dense packaging, the compression channel preferably exhibits a suitable small length, more preferably the length of the compression channel is in the range of up to 0.3 mm. Alternatively, the compression channel is not applied to the inventive microfluidic chip. In this case, the compression chamber is directly connected with its inlet to the outlet of the processing compartment. In order to further assist complete filling of the processing compartment, the outlet of the processing compartment connecting to the compression channel is located at the most distal distance from the inlet to the processing compartment. In case of a circular cross section of the processing compartment, this means the most distal distance is the diameter of the circle. In case of a square or rectangular cross section, this means the most distal distance is the diagonal thereof.

In addition or alternatively, the basic substrate is preferably coated on the upper and lower surface at least in the surface area comprising the dead-end well compartments, preferably the processing compartment, the compression channel and the through-hole compression compartment with the coating material thereby forming the unvented microfluidic network of the microfluidic chip. More preferably, the coating material is configured to not interfere with the processing, e.g. is made of a suitable transparent material, more preferably a suitable transparent foil or transparent plate as set out in more detail hereinbefore. The coating material can be bonded to the basic substrate with any suitable method, such as thermally using, e.g. a hydraulic press, or with solvents or other adhesives.

All features and embodiments disclosed with respect to the first aspect of the present invention are combinable alone or in (sub-)combination with each of the second and third aspects of the present invention respectively including each of the preferred embodiments thereof, provided the resulting combination of features is reasonable to a person skilled in the art.

According to the second aspect of the present invention, a process for producing the inventive microfluidic chip is provided. Correspondingly, a microfluidic chip obtainable by the production process of the second inventive aspect or any of its preferred embodiments is inventively disclosed.

According to the second aspect of the present invention, the inventive process comprises or consists of the following steps:

a) producing a basic substrate having in parallel an upper and a lower surface comprising the microfluidic network as defined with respect to the first aspect of the present invention comprising at least a given junction $J_g$, where the microfluidic channel is branched in three or more downstream sub-channels of a the corresponding given generation $CG_g$,
   i. arranging each of the downstream sub-channels of the given generation $CG_g$ respectively as a recess either in the upper or the lower surface of the basic substrate,
   ii. arranging the microfluidic channel connecting upstream to the given junction $J_g$ as a through-hole perpendicular to the upper and lower surface of the basic substrate and connecting it at the given junction $J_g$ to each of the downstream sub-channels of the given generation $CG_g$, preferably further bending the microfluidic channel at a section S at the surface of the basic substrate opposite to the downstream sub-channels of the given generation $CG_g$ in such a way that it is further arranged as a recess in this surface of the basic substrate, and b) coating the upper and lower surfaces of the basic substrate of step a) at least in the surface area comprising the downstream sub-channels of the given generation $CG_g$ and the microfluidic channel connecting upstream to the given junction $J_g$ with a coating material thereby forming the unvented microfluidic network of the microfluidic chip.

The second aspect of the present invention is advantageous as it facilitates simple and cost effective production of the inventive microfluidic chip. Moreover, it facilitates an increase in number of compartments, in particular a number of dead-end well compartments per surface area and/or volume of the obtainable microfluidic chip. Moreover, due to the fact that the microfluidic network is defined as set out with respect to the first aspect of the present invention, the obtainable microfluidic chip also facilitates equal partitioning of the liquid composition, i.e. that multiple aliquots of liquid composition respectively have the same volume and constitution.

In general, the coating material is applied to the basic substrate in such a way that the unvented microfluidic network is produced, i.e. that the resulting unvented microfluidic network withstands any overpressure inside the microfluidic network, which results from operation of the microfluidic chip without any of the substrate material parts of the basic substrate or the coating material breaking, cracking, detaching etc. As an example, the obtainable inventive microfluidic chip comprises an unvented microfluidic network, which remains unvented during operation for resulting overpressure within the microfluidic network of up to 10 bar. This means that under operation, i.e. flow of the liquid composition into the dead-end well compartments and resulting overpressure of up to 10 bar, the inventive microfluidic chip can sustain the overpressure and prevent the release of any gas and liquids for at least 15 minutes, preferably for at least 30 minutes.

According to an additional or alternative preferred embodiment, the coating material is bonded to the basic substrate thermally using a hydraulic press, or with solvents or using an adhesive. The coting material can be in a suitable form of a foil or a plate and, thus, exhibits a suitable thickness in order to create the unvented microfluidic network. The coating material is preferably made of the same material as the basic substrate, more preferably polycarbonate.

According to an additional or alternative preferred embodiment of the second aspect of the present invention, producing the basic substrate according to step a) further comprises arranging the multiple dead-end well compartments respectively as a recess in the lower surface of the basic substrate, preferably wherein in case the multiple dead-end well compartments respectively comprise a processing compartment, a compression compartment and a compression channel the processing compartments and the compression channels are respectively arranged as a recess in the lower surface of the basic substrate. This preferred configuration of arranging the processing compartments respectively as a recess in the lower surface of the basic substrate facilitates an improved processing, such as e.g. heating and/or cooling of the multiple aliquots of liquid in case a heating/cooling means is arranged in contact with the lower surface of the inventive microfluidic chip. According to a further preferred embodiment the respective recesses of the processing compartment and the compression channel do not form through holes through the basic substrate. Such a preferred configuration is in particular advantageous for the processing compartment, as it allows attaching an agent to the basic substrate delimiting the respective recesses, more preferably to attach the agent to a matte structured region of the recess of the processing compartment.

In addition or alternatively, the compression compartments preferably respectively extend perpendicular to the upper and lower surface of the basic substrate, more preferably wherein the compression compartments are respectively formed as a through-hole perpendicular to the upper and lower surfaces of the basic substrate. These preferred embodiments on the one hand facilitates simple and cost effective production of the inventive microfluidic chip or the inventively obtainable microfluidic chip and on the other hand facilitates dense packaging of the dead-end well compartments, by providing a comparatively big volume for the compression compartment in relation to its surface area on the upper or lower surface of the basic substrate.

In addition or alternatively, the coating material is preferably further applied in step b) at least in the surface area comprising the dead-end well compartments, preferably the processing compartment, the compression channel and the through-hole compression compartment thereby forming the unvented microfluidic network of the microfluidic chip.

According to an additional or alternative preferred embodiment of the second aspect of the present invention, step a) further comprises injection molding of a polymeric substrate, preferably wherein the injection molded polymeric substrate forming the microfluidic chip does not interfere with processing of the aliquot of liquid composition, preferably is transparent and more preferably is selected from the group consisting of polycarbonate, cyclic olefin copolymer, polystyrene, cyclic olefin polymer or poly(methyl methacrylate).

All features and embodiments disclosed with respect to the second aspect of the present invention are combinable alone or in (sub-)combination with each of the first and third aspects of the present invention respectively including each of the preferred embodiments thereof, provided the resulting combination of features is reasonable to a person skilled in the art.

According to the third aspect of the present invention, the inventive microfluidic chip of the first aspect or a microfluidic chip obtainable according to the second aspect of the present invention is used for partitioning a liquid composition into multiple aliquots and processing the aliquots, preferably for conducting a chemical synthesis and/or chemical or biochemical analysis and/or proteomic analysis, more preferably for conducting a biochemical assay selected from the group consisting of an enzymatic analysis, such as a glucose or a lactate assay; a DNA analysis, such as a polymerase chain reaction (PCR) and in particular a PCR with high-throughput sequencing.

Preferably, the inventive microfluidic chip of the first aspect or a microfluidic chip obtainable according to the second aspect of the present invention is used for partitioning a liquid composition into multiple aliquots, wherein each of the aliquots fills out a respective processing compartment disclosed in more detail hereinbefore. To prevent cross-contamination between the processing compartments, the aliquots may then be separated from each other by means known in the art, such as with a fluid immiscible liquid composition, e.g. inert gas, air, oil or other hydrophobic fluid in case of an aqueous liquid composition, or an immiscible aqueous liquid in case of a hydrophobic liquid composition, preferably with an incompressible fluid immiscible with the liquid composition, most preferably with mineral oil and/or silicone oil.

In the context with any of the first to third aspects of the present invention, the microfluidic chip can be connectable or is connected to one or more further microfluidic devices, such as for preprocessing the liquid composition. Accordingly, the further microfluidic device is connectable to the microfluidic chip according to the present invention as a separate microfluidic substrate or alternatively is connected to the microfluidic chip according to the present invention by being arranged on the same substrate of the microfluidic chip of the first or obtainable by the second aspect of the present invention.

As an example, when conducting a PCR assay using the microfluidic chip of the first or obtainable by the second aspect of the present invention, such a further microfluidic device can preferably facilitate isolation of nucleic acid. More preferably, the connected/connectable further microfluidic device is configured as a vented microfluidic device, such as a vented microfluidic isolation device for nucleic acid. In case the further microfluidic device is provided in vented form, the overpressure, which consequently builds up in the unvented microfluidic network of the microfluidic chip of the first or obtainable by the second aspect of the present invention during operation is not furthermore increased.

Alternatively or in addition, the liquid composition is preferably transferred to the inlet port of the microfluidic chip of the first or obtainable by the second aspect of the present invention from a connected or connectable reservoir, wherein the reservoir exhibits a cross section in the plane perpendicular to the direction of flow having dimensions small enough to ensure homogenization of constitution of the liquid composition in that plane by means of diffusion alone, preferably wherein the reservoir is a microfluidic device, even more preferably a microfluidic channel or an elongated microfluidic chamber. In other words, the liquid composition provided to the inlet port may only exhibit concentration gradients/changes along the direction of flow, but is homogenous across the cross section area perpendicular to the direction of flow. For microfluidic channels and/or elongated microfluidic chambers having a longitudinal axis of symmetry, the "direction of flow" may be represented by such an axis. The microfluidic chip of the first or obtainable by the second aspect of the present invention is especially useful when avoiding the need to mix and/or homogenize the constitution of the liquid composition before partitioning is desirable, while a need exists to obtain aliquots exhibiting essentially the same concentration of each of their constituents.

All features and embodiments disclosed with respect to the third aspect of the present invention are combinable alone or in (sub-)combination with each of the first and second aspects of the present invention respectively including each of the preferred embodiments thereof, provided the resulting combination of features is reasonable.

DETAILED DESCRIPTION OF THE FIGURES

Further characteristics and advantages of the present invention will ensue from the following description of embodiments of the inventive aspects with reference to the accompanying drawings.

The microfluidic chip as disclosed in the accompanying drawings relates to an inventive microfluidic chip comprising an inventively defined microfluidic network suitable for partitioning a liquid composition, preferably a liquid composition comprising isolated nucleic acid for further processing, in particular for carrying out a PCR analysis. Although the inventive microfluidic chip is in the following described in this configuration, other configurations encompassed by the present invention and in particular by the claimed subject matter are not limited by the following exemplary description.

Dimensions, in particular distances, volumes, concentrations and ratios provided in the context of the present invention, in particular in the following description shall comprise suitable deviations in the art respectively applicable to the respective dimensions and/applications. The illustrated embodiments are, however, in particular not limited to the actual dimensions given, but can have other suitable ranges of dimensions as described in the general description hereinbefore.

Figure 1B:
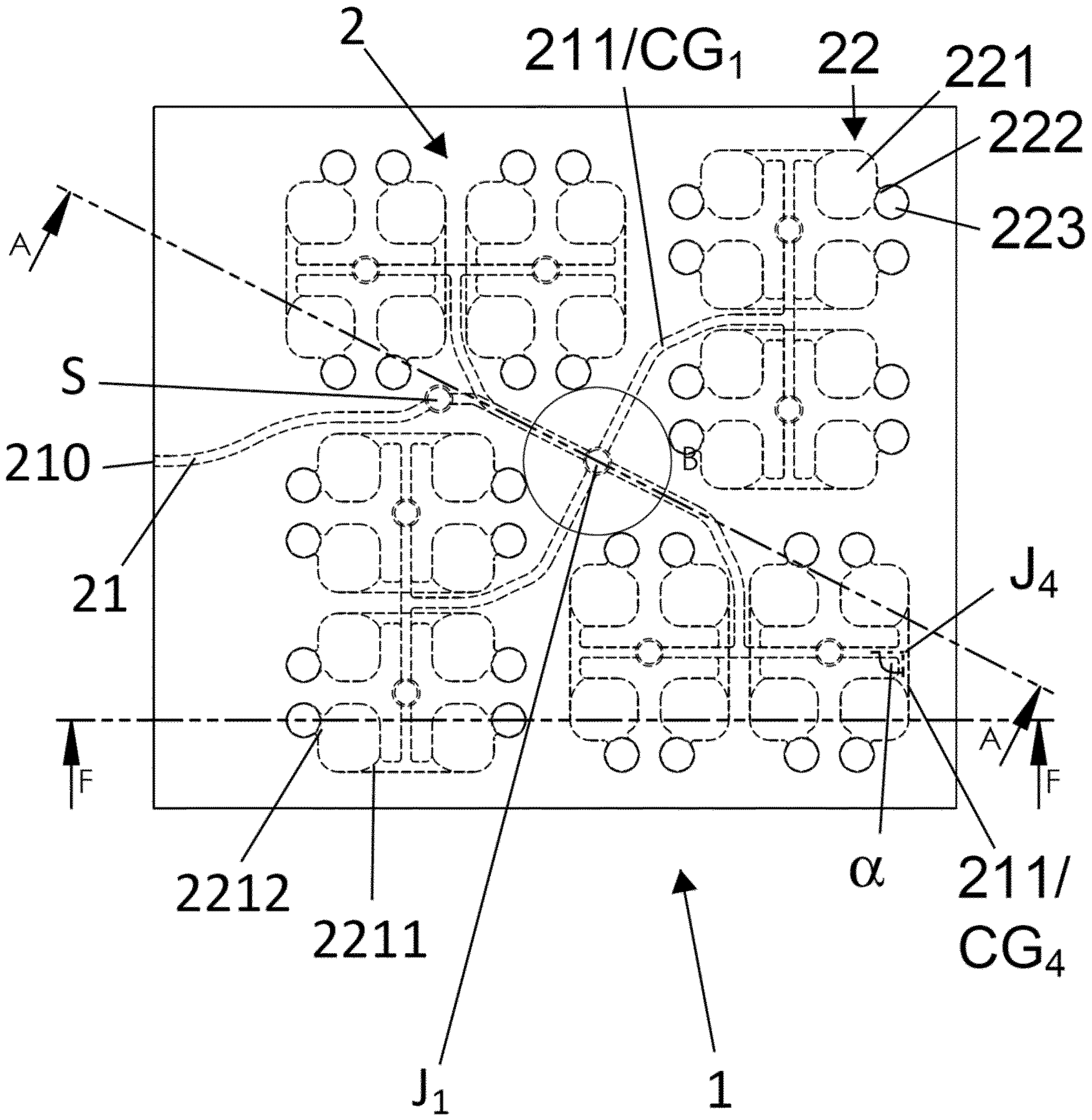
FIG. 1B represents a simplified top view of an inventive microfluidic chip defining cross section planes A-A and F-F.
Figure 1C:
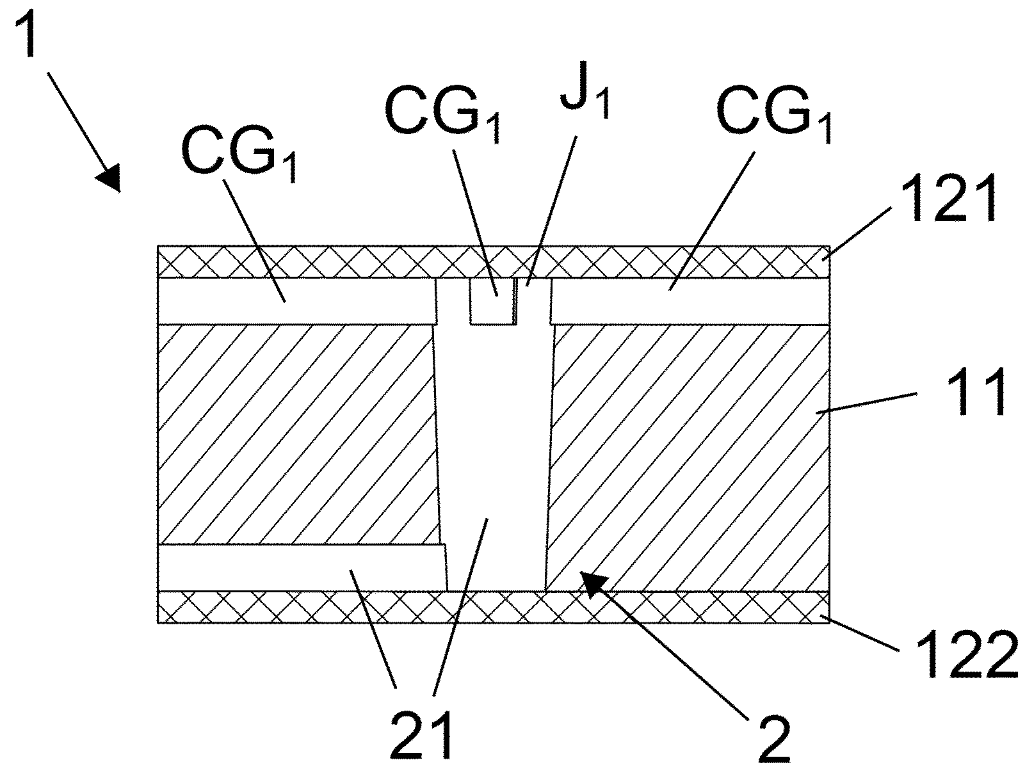
FIG. 1C represents a simplified cross section side view in plane A-A of part of an inventive microfluidic chip in the area of a junction branching a microfluidic channel into three or more sub-channels.
Figure 1D:
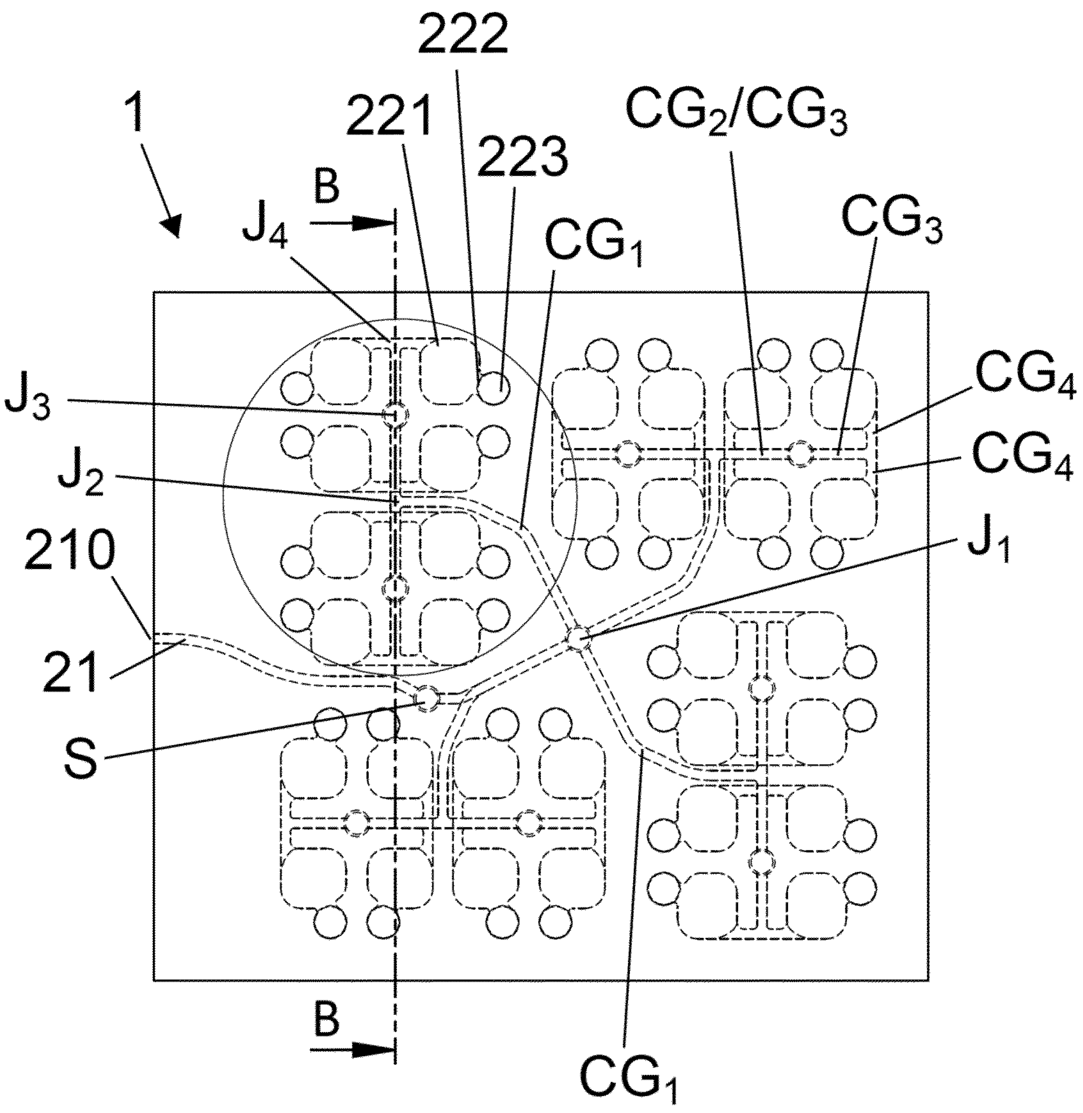
FIG. 1D represents a simplified bottom view of an inventive microfluidic chip defining cross section plane B-B, FIG. 1 E represents a simplified cross section in plane F-F side view of an inventive microfluidic chip in the area of dead-end well compartments.
Figure 1E:
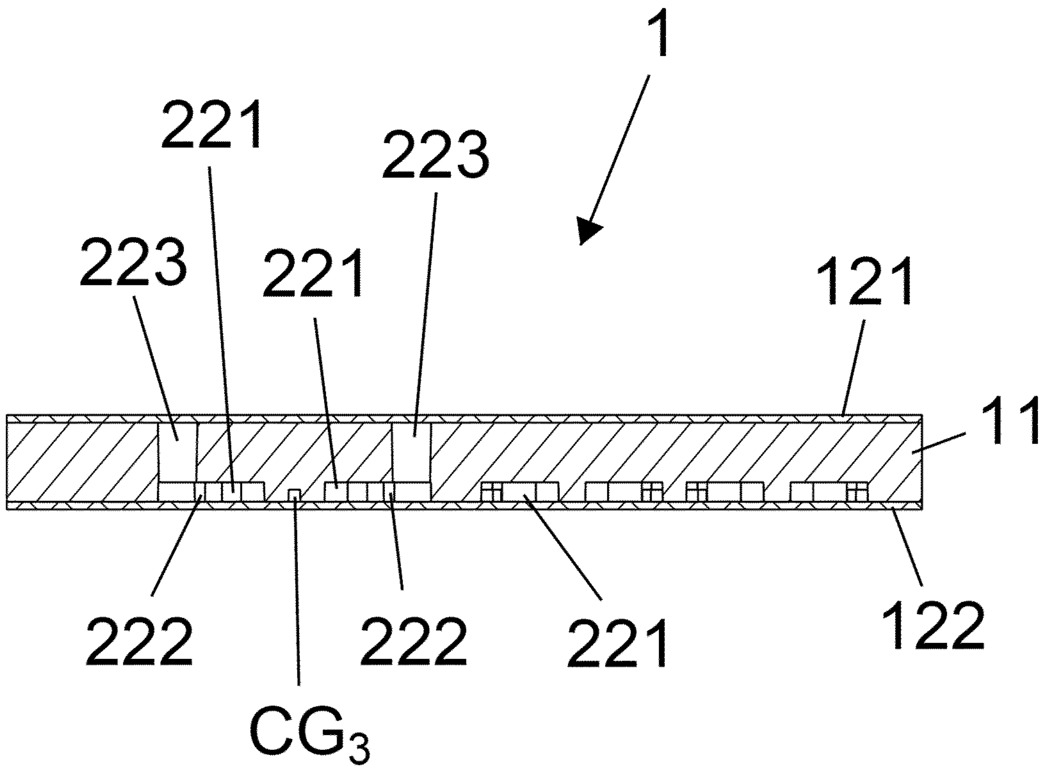

All figures relating to number 1 represent simplified views of the inventive microfluidic chip 1 as a whole, such as in FIGS. 1A, 1B and 1D, or in part as a cross sectional view, such as in FIGS. 1C and 1E.

FIG. 1A shows a perspective top view of the inventive microfluidic chip 1, comprising the basic substrate 11, the coating material in form of a foil applied to the upper surface of the basic substrate 121 and to the lower surface of the basic substrate 122 in order to build the unvented microfluidic network 2 drawn in dotted lines and the inlet port 210 connectable to a reservoir of a liquid composition (not shown).

The inventive microfluidic chip 1 may be adapted to integrate the sample reservoir in connection or connectable to the inlet port 210 and optionally pre-processing microfluidic devices, such as facilitating isolation of nucleic acid.

In case the inventive microfluidic chip 1 is used for different applications, different preprocessing devices can be connected or integrated to the inventive microfluidic chip.

The material of the basic substrate 11 and preferably of the coating material 121 and 122 generally facilitates to build the unvented microfluidic network and is accordingly formed of a suitable liquid and gas impermeable material as set out in more detail in the general description hereinbefore.

Preferably basic substrate 11 and preferably the coating material 121 and 122 reduce interference with the processing of the aliquot of liquid composition, in particular by PCR analysis. Accordingly, the material of the basic substrate 11 and of the coating material 121 and 122 is preferably suitable to withstand the processing temperatures and allows inspection, in particular detection of reaction results. Suitable materials can be selected from the group consisting of suitable glass and suitable polymers, wherein the polymers are preferably selected from the group consisting of polycarbonate, cyclic olefin copolymer, polystyrene, cyclic olefin polymer or poly(methyl methacrylate). In the present case, polycarbonate, in particular of high viscosity, is used both for the basic substrate 11 and for the coating material 121 and 122.

The upper and lower surface area of the inventive microfluidic chip 1 is respectively shown in square form, but it can also have any other form, such as rectangular, round, oval etc. Presently the square surface area has a side length of 2 cm resulting in as surface area of 400 $mm^2$.

The thickness of the inventive microfluidic chip 1 generally can range from 350 μm to 14 mm, and preferably is in the range of 640 μm to 6 mm, most preferably between 1,200 μm and 3,500 μm. In the present case, the thickness thereof is 2,250 μm, thus resulting in a volume of the inventive microfluidic chip is approximately 900 $mm^3$.

Accordingly, the thickness of the basic substrate 11 generally can range from 300 μm to 10 mm, and preferably is in the range of 500 μm to 3 mm. In the present case, the thickness thereof is approximately 2 mm, thus resulting in a volume of the inventive basic substrate of approximately 800 $mm^3$.

The thickness of the coating material 121 and 122 can generally range from 25 μm to 2 mm, and preferably is in the range of 70 to 500 μm. In the present case, the thickness is 125 μm.

The inlet port 210 can have any suitable configuration. In the present case the inlet port 210 is configured as an opening in the basic substrate 11 which connects the microfluidic channel 22 (dotted lines) to a reservoir of liquid composition (not shown).

FIGS. 1B and 1D respectively display top and bottom views of the inventive microfluidic chip 1 in transmission, which means that the unvented microfluidic network is shown in dotted lines, as it is arranged in the basic substrate 11 and covered by the coating material 121 and 122. FIG. 1B furthermore comprises indication lines for the cross sections A-A and F-F and FIG. 1D furthermore comprises an indication line for the cross section B-B.

Accordingly, the inventive microfluidic chip 1 comprises an inlet port 210 in form of an opening to connect the microfluidic channel 21 to a reservoir of liquid composition (not shown in the figures).

The microfluidic channel 21 is arranged in a first plane parallel to the upper surface of the microfluidic channel, which is better visible in FIG. 1C. In direction of the flow path of the liquid composition, the microfluidic channel 21 is then connected a section S, where it bends via a section channel SC (not visible in FIGS. 1B and 1D due to the perpendicular arrangement in relation to the surface planes of the microfluidic chip) to a second plane of the microfluidic chip 1, which is spaced from the first plane and arranged parallel to the lower surface plane. The section channel SC is arranged perpendicular to the surface of the microfluidic chip 1. This change of plane in particular further assists to increase the number of dead end well compartments per surface area and/or volume of the inventive microfluidic chip.

The microfluidic channel 21 does not branch at this section S into two or more sub-channels. The microfluidic channel 21 continues in direction of flow to the junction J1, where it bends from the second lower plane perpendicular to the first upper plane and connects to junction $J_1$. At junction $J_1$, the microfluidic channel is branched into four downstream sub-channels 211 of respective first generation $CG_1$. This perpendicular arrangement on the one hand facilitates to further assists to increase the number of dead end well compartments per surface area and/or volume of the inventive microfluidic chip. On the other hand, it facilitates to achieve the same intersection angle α for each of the four connected downstream sub-channels of first generation $CG_1$/211.

The intersection angle α is due to the perpendicular arrangement of the microfluidic channel 21 connecting to $J_1$ 90°±5% for each of the sub-channels $CG_1$, which is shown in detail in FIG. 1C. The intersection angle α is measured in the junction J1 from the axis of the microfluidic channel 21 to the axis of the sub-channel $CG_1$. Each sub-channel $CG_1$ including the subsequently connected sub-channels of further second, third and fourth generation $CG_2$, $CG_3$ and $CG_4$ including the respectively eight connected dead-end well compartments 22 accordingly form a sub-part of microfluidic network $MNsub_1$ with a respective volume $VMNsub_1$. As the number of dead-end well compartments of each of the four microfluidic network parts $MNsub_1$ is the same (=8), each of $MNsub_1$ has the same respective volume $VMNsub_1$.

In direction of flow the sub-channel $CG_1$ continues in the first plane and connects to a second junction $J_2$, where it is branched into two subsequent downstream sub-channels $CG_2$, which are respectively arranged also in the first plane until they are bended perpendicular to the first plane to connect with the third junction $J_3$, which is positioned in the second lower plane and which branches the sub-channels $CG_2$ respectively into two further subsequent sub-channels $CG_3$. In junction $J_2$ the intersection angle α between the axis of $CG_1$ and the axis $CG_2$, which are both arranged in the first plane, is also approximately 90°. The sub-parts of microfluidic network $MNsub_2$ respectively exhibit the same volume $VMNsub_2$, as the number of dead-end well compartments of each of the respective two microfluidic network parts $MNsub_2$ formed downstream in the same junction $J_2$ is the same and equals 4.

In junction $J_3$ the intersection angle α between the axis of $CG_2$ arranged perpendicular to $CG_3$ and the axis of $CG_3$, which is arranged in the second plane, is also approximately 90°. The sub-parts of microfluidic network $MNsub_3$ respectively exhibit the same volume $VMNsub_3$, as the number of dead-end well compartments of each of the respective two microfluidic network parts $MNsub_3$ formed downstream in the same junction $J_3$ is the same and equals 2.

The respective sub-channels $CG_3$ are arranged in the second lower plane, continue in direction of flow, and connect to junction $J_4$ also located in the second plane, which further branches each sub-channel $CG_3$ into two further subsequent downstream sub-channels $CG_4$, which are also arranged in the second plane. The intersection angle α in the second plane in junction $J_4$ between the sub-channels $CG_3$ and $CG_4$ is also approximately 90° for both of the sub-channels $CG_4$. The sub-parts of microfluidic network $MNsub_4$ respectively exhibit the same volume $VMNsub_4$, as the number of dead-end well compartments of each of the respective two microfluidic network parts $MNsub_4$ formed downstream in the same junction $J_4$ is the same and equals 1.

The sub-channels $CG_4$ respectively represent the last subsequent downstream sub-channel $CG_L$, which connects to the dead-end well compartments 22, which is also at least partly arranged in the second plane.

According to the present embodiment, the microfluidic network 2 comprises mirror-inverted parts.

In general, the hydraulic diameter of the sub-channels 211 is of suitable dimension, preferably 600 μm or less, preferably it is in the range of 500 μm to 100 μm, more preferably 300 μm to 150 μm. In the present case, the hydraulic diameter is approximately 300 μm.

As already set out in the general description of the invention above, the fluidic distance in the direction of flow between two consecutive given junctions $J_G$ and $J_{G+1}$ is preferably at least three times the hydraulic diameter, more preferably in the range of five times the hydraulic diameter to twenty five times the hydraulic diameter, more preferably ten times the hydraulic diameter to twenty five times the hydraulic diameter.

In the present case, the fluidic distance in flow direction for the following sub-channels between two consecutive given junctions $J_g$ and $J_{g+1}$ is as follows:

fluidic length of $CG_1$ between $J_1$ and $J_2$: 7 mm,
fluidic length of $CG_2$ between $J_2$ and $J_3$: 3.4 mm,
fluidic length of $CG_3$ between $J_3$ and $J_4$: 1.7 mm.

The fluidic length of $CG_4$, which is in the present case also $CG_L$, as it connects to the inlet 2211 of dead-end well compartment 22, more specifically the inlet 2211 of the processing compartment 221, can have a suitable fluidic length, preferably in the range of 0.3 mm to 1.5 mm and in the present case is 0.6 mm.

The height perpendicular to the flow direction of each sub-channel may have any suitable dimension, presently is approximately 300 μm.

The processing compartments 221 can have any suitable form, and presently form in bottom view a rectangular form with rounded corners, wherein the inlet 2211 and the outlet 2212 are respectively arranged as openings at diagonal corners of the processing compartment 221, which also forms the longest distance within the processing compartment, as the height of the processing compartment perpendicular to the second plane is smaller than the length of the rectangular form. According to the present embodiment, the rectangular form of the processing compartment 221 has a length of approximately 2 mm and a width of 1.8 mm, whereas the height is approximately 0.5 mm. Such a configuration further assists optimal filling of the processing compartments 221, in particular reducing residual gas in the processing compartment, which could interfere with processing of the aliquot of the liquid composition. In addition, due to choosing the diagonal the longest distal distance has been chosen, which assists in complete filling of the processing compartment 221 prior to filling the compression channel 222. According to the present embodiment, the rectangular form of the processing compartment 221 has a length of approximately 2 mm and a width of 1.8 mm, whereas the height is approximately 0.5 mm. The height approximately 0.5 mm, e.g. 0.49 mm, and the corresponding height of the column of the aliquot of liquid composition filling out the processing compartment has been found especially advantageous for rapid and uniform thermal cycling of the aliquots of liquid composition with heating electromagnetic radiation incident upon the upper surface of the microfluidic chip.

The compression compartment 223 is connected via an inlet 2231 to a compression channel 222 and to the outlet 2212 of the processing compartment 221. It preferably forms a cylinder or has a conical shape arranged perpendicular to the second plane in direction of the first plane, wherein the base surface forms in bottom view of the microfluidic chip a circular cross section. The conical shape may advance expelling the basic substrate from a mold after injection molding.

In case the compression compartment 223 forms a cylinder the base surface has preferably a diameter of approximately 1 mm and a height of approximately 2 mm. In case the form is conical, one of the base surfaces, preferably the surface arranged in the first upper plane, is preferably approximately 0.8 mm in diameter with an of inclination approximately 1°, so that the base surface of the opposite plane, preferably the second lower plane is respectively smaller and wherein the height of the conical shape is approximately 2 mm.

In the present embodiment, the dimensions in cross section, length and height of the compression channel 222 are as follows: width at narrowest point 0.6 mm to 0.68 mm at the inlet to compression compartment, height 0.49 mm and length 0.27 mm.

The junctions $J_1$ to $J_4$ can have the same or different, dimensions. The microfluidic channels connecting upstream to the respective junctions $J_1$ to $J_4$ and arranged perpendicular to the respective first or second plane can be configured as cylinders or may exhibit a conical shape. In the present case, all junctions $J_1$ to $J_4$ have approximately the same dimensions.

In case of a cylinder, the diameter of the base surface of the cylinder is approximately 0.8 mm and the height is approximately 2 mm. In case the form is conical, one of the base surfaces, preferably the surface arranged in the first upper plane, is approximately 0.8 mm in diameter with an inclination of approximately 2°, so that the base surface of the opposite plane, preferably the second lower plane is respectively smaller and wherein the height of the conical shape is approximately 2 mm. This conical arrangement of the microfluidic channel 21 connecting upstream to $J_1$ and connecting there to four downstream sub-channels $CG_1$ (only three displayed in the cross sectional view) is in particular visible from the enlarged view in FIG. 1C, which represents a part of the cross section between A to A in side view on the extracted part of the microfluidic network 2.

In FIG. 1E the arrangement of the dead-end well compartments 22 is in particular further displayed in the simplified cross sectional view on the side of part of the inventive microfluidic chip 1 comprising part of the microfluidic network 2 with cross section of downstream sub-channel $CG_3$ as well as cross section of respective dead-end well compartments 22 including a processing compartment 221 connected to a compression channel 222, which is connected to a compression compartment 223. FIG. 1E also displays the arrangement of the upper and lower coating materials, preferably foils 121 and 122 respectively connected to the basic substrate 11.

As disclosed in the general description of the present invention, the thickness of the wall is—due to the present manufacturing requirement of injection molding—not less than 0.6 mm. This wall distance is realized in particular between the sub-channel $CG_3$ and the respectively downstream connected processing compartments 221 of the sub-part $MNsub_3$. Also in between the neighboring processing compartments 221/compression compartments 223 of the different sub-parts $MNsub_3$ a wall thickness of approximately 0.6 mm is realized.

Figure 2A:
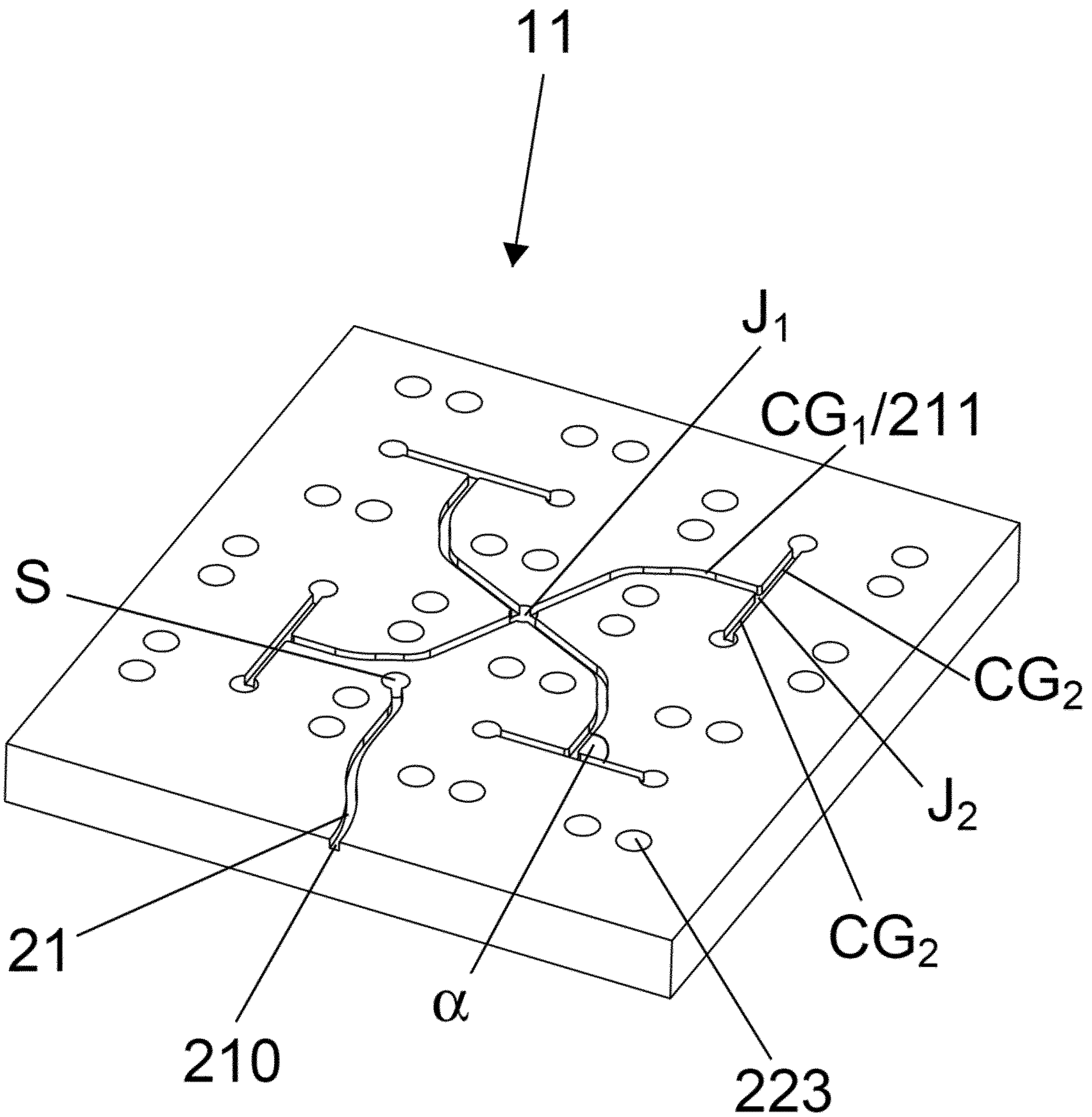
FIG. 2A represents a simplified perspective top view of a basic substrate according to the invention exhibiting the part of the microfluidic network arranged as recess and/or through hole on the upper surface of the basic substrate.
Figure 2B:
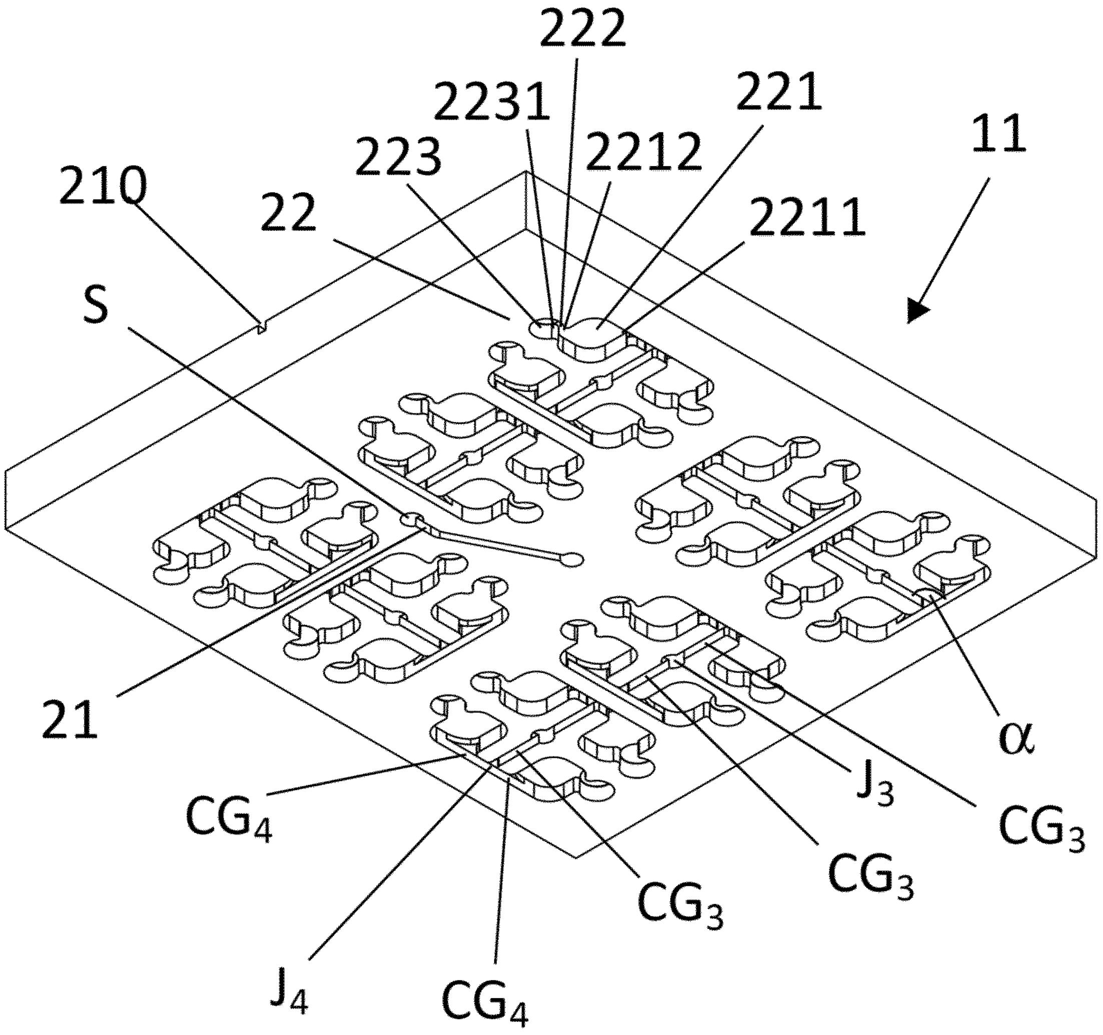
FIG. 2B represents a simplified perspective bottom view of a basic substrate according to the invention exhibiting the part of the microfluidic network arranged as recess and/or through hole on the lower surface of the basic substrate.
Figure 2C:
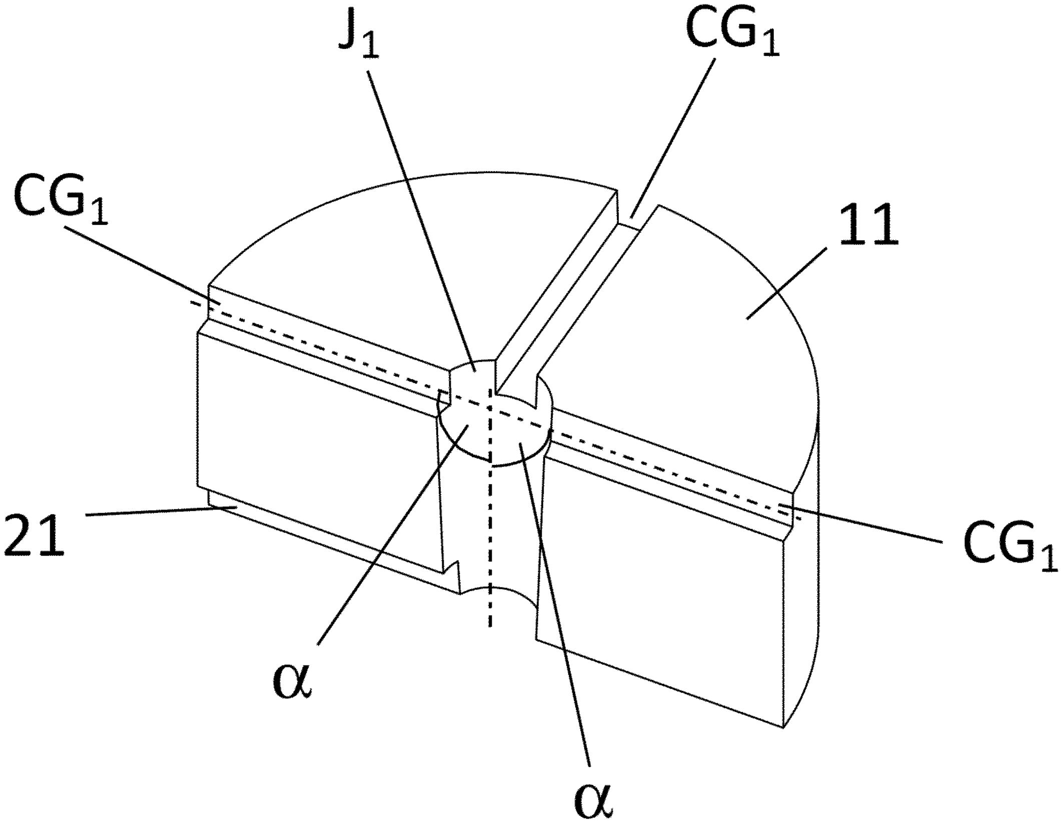
FIG. 2C represents a simplified perspective top view of a cross section in plane A-A in an extracted part of a basic substrate in the area of a junction branching the microfluidic channel upstream into three or more downstream sub-channels in particular displaying the intersection angle $\alpha$.
Figure 2D:
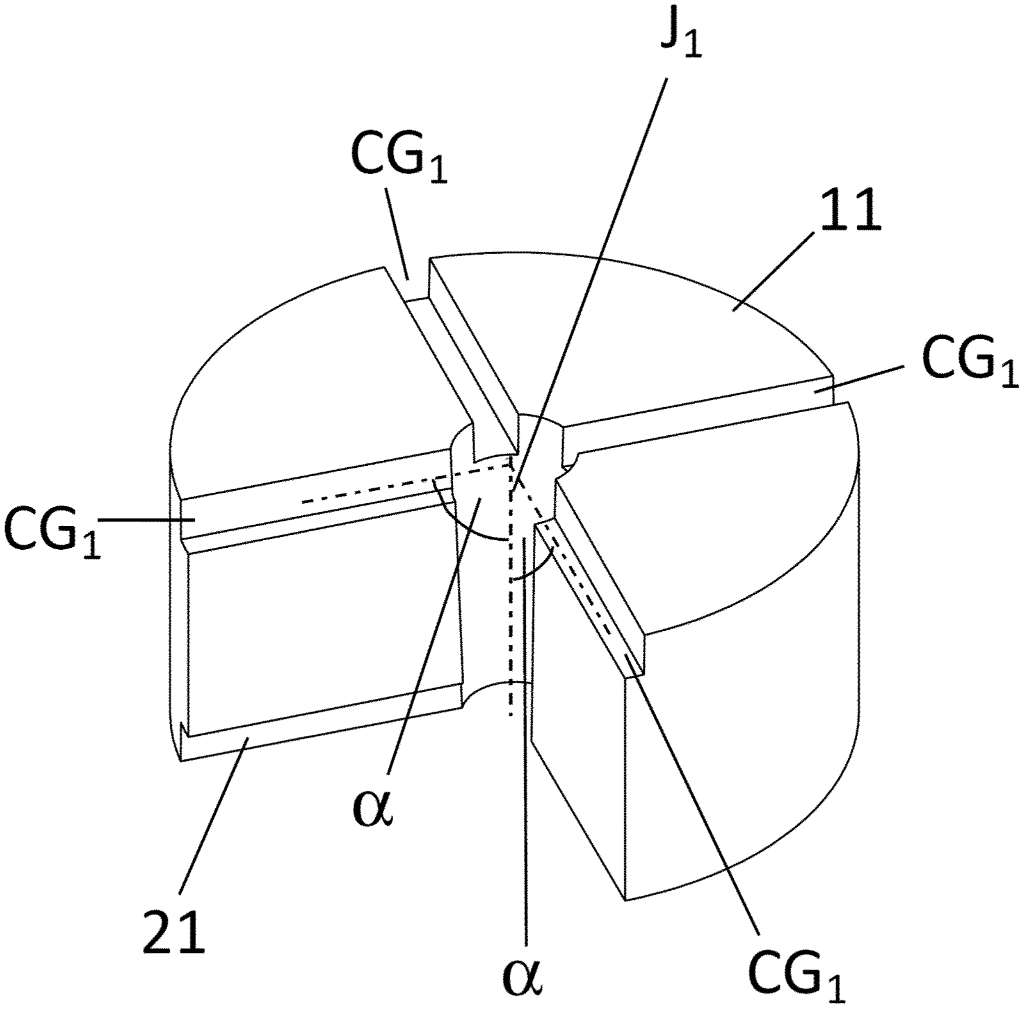
FIG. 2D represents a simplified perspective top view of a partial cross section in plane A-A in an extracted part of a basic substrate in the area of a junction branching the microfluidic channel upstream into three or more downstream sub-channels in particular displaying the intersection angle $\alpha$.

All figures relating to number 2 represent simplified views of the basic substrate 11 as part of the inventive microfluidic chip 1 as a whole, such as in FIGS. 2A and 2B, or in part as cross sectional view, such as in FIGS. 2B to 2E.

Accordingly, FIG. 2A represents a perspective top view on the basic substrate 11 with an upper surface, representing the first upper plane with respect to FIGS. 1A to 1E and a lower surface (visible in FIG. 2B), representing the second lower plane with respect to FIGS. 1A to 1E.

The basic substrate 11 is manufactured with suitable processes, preferably an injection molding process. The basic substrate 11 comprises the inlet port 210 as an opening recess connected to the microfluidic channel 21, which is arranged as a recess into the upper surface. The characteristics of the recess are described in the general part of the description as well as with respect to FIGS. 1A and 1E.

Furthermore, FIG. 2A shows section S, where the microfluidic channel 21 bends via a section channel SC (not visible in FIG. 2A due to the perpendicular arrangement thereof in relation to the upper surface plane of the basic substrate) from the upper surface to the lower surface of the basic substrate 11 without branching into two or more sub-channels The microfluidic channel 21 is arranged as respective recesses in the upper and lower surface of the basic substrate 11. Furthermore, junction $J_1$ is arranged on the upper surface of the basic substrate 11 in the center thereof. It connects the microfluidic channel 21 arranged on the lower surface of the basic substrate as recess and bending perpendicular to the surface plane in order to connect with the junction $J_1$ (visible on FIG. 2B). $J_1$ further branches the microfluidic channel 21 into four downstream sub-channels $CG_1$, which represent respectively four congruent sub-parts of microfluidic network $MNsub_1$. Due to the perpendicular arrangement of the microfluidic channel 21 connecting upstream to junction $J_1$, the intersection angle $\alpha$ measured in junction $J_1$ from the axis of the microfluidic channel 21 to axis of each of the four sub-channels $CG_1$ is respectively approximately 90°. The intersection angle $\alpha$ for junction $J_1$ is in particular visible in FIGS. 2C and 2D, which show an enlarged side view of part of the cross section from A to A of the basic substrate 11, wherein the microfluidic channel 21 bending perpendicular to the lower surface and connecting at the upper surface to junction $J_1$ is shown as well as the respective sub-channels $CG_1$.

Furthermore, FIG. 2A shows four junctions $J_2$, which respectively branch each of the sub-channels $CG_1$ into respectively two downstream sub-channels $CG_2$, i.e. eight sub-channels $CG_2$, wherein the pair of the two sub-channels $CG_2$ from the same junction $J_2$ form respectively two congruent sub-parts of microfluidic network $MNsub_2$. Furthermore, FIG. 2A displays the intersection angle $\alpha$ at junction $J_2$ measured in the plane of the upper surface between the axis of $CG_1$ to the axis of $CG_2$. The intersection angle $\alpha$ is in the present embodiment approximately 90°.

FIG. 2B represents a perspective bottom view on the lower surface of the basic substrate 11. It shows the inlet port 210 connecting to the microfluidic channel 21 on the upper surface of the basic substrate 11 (visible in FIG. 2A). On the lower surface, it shows the section S, where the microfluidic channel 21 changed plane via a section channel (not visible in FIG. 2B) from the upper surface of the basic substrate 11 to the lower surface of the basic substrate 11. The microfluidic channel 21 is arranged as a recess into the lower surface and further in direction of flow bends perpendicular to the lower surface to connect on the upper surface with the junction $J_1$ (visible in FIG. 2A).

Furthermore, FIG. 2B displays eight junctions $J_3$, which respectively branch each of the eight sub-channels $CG_2$ (visible in FIG. 2A) into two downstream sub-channels $CG_3$. Due to the perpendicular arrangement of each of the sub-channels $CG_2$ connecting upstream to junction $J_3$, the intersection angle $\alpha$ measured in junction $J_3$ from axis of $CG_2$ to axis of $CG_3$ is approximately 90°. This arrangement is in particular visible from FIG. 2F, which represents a simplified cross section side view in plane B-B of part of the basic substrate 11 in the area of junction and $J_3$, wherein the sub-channel $CG_2$ is arranged in the upper surface of the basic substrate and bends perpendicular to the lower surface as a through-hole to connect to the junction $J_3$ arranged on the lower surface of the basic substrate 11, branching the sub-channel $CG_2$ into two sub-channels $CG_3$ arranged in the lower surface of the basic substrate 11 as respective recesses. The intersection angle $\alpha$ measured in junction $J_3$ from axis of $CG_2$ to axis of $CG_3$ is approximately 90°.

Furthermore, FIG. 2B displays that each of the sixteen sub-channels $CG_3$ are arranged in the lower surface of the basic substrate 11 as respective recesses connecting to sixteen junctions $J_4$, wherein each of the sixteen sub-channels $CG_3$ is further branched into two sub-channels $CG_4$, i.e. in total 32 sub-channels $CG_4$. The intersection angle $\alpha$ measured in junction $J_4$ in the plane of the lower surface of the basic substrate from the axis of $CG_3$ to the axis of $CG_4$ is approximately 90°.

Each of the sub-channels $CG_4$ forms the respective last sub-channel $CG_L$, which respectively connects to a dead-end well compartment 22, i.e. a total of 32 dead-end well compartments 22. Each dead-end well compartment 22 comprises an inlet opening 2211 to the processing compartment 221, which is arranged as cuboid recess into the lower surface of the basic substrate 11, an outlet opening 2212 to the compression channel 222, which is arranged as recess into the lower surface of the basic substrate, and wherein the compression channel 222 is connected to an inlet opening of 2231 of the compression compartment 223, wherein the compression compartment 223 is of cylindrical of conical shape as described hereinbefore in particular with respect to the FIGS. 1B and 1D. The compression compartment 223, thus, forms a through-hole through the basic substrate 11, which connects the lower and upper surface of the basic substrate.

In this example, the 32 dead-end well compartments 22 each having a cross section surface area of approximately 4.37 $mm^2$, thus, a total of approximately 140 $mm^2$ in the plane parallel to either an upper or a lower surface of the basic substrate 11 per surface area of 400 $mm^2$ (2 cm×2 cm). Calculated on the processing compartments 221 a surface area of approximately 115 $mm^2$ is covered by the processing compartments 221 per surface area of 400 $mm^2$ of the basic substrate 11. Thus, the dead end well compartments 22 have a percentage of approximately 35% or less per surface area of the basic substrate and the processing compartments 221 have a percentage of approximately 28.5 per surface area of the basic substrate. Calculated on the volume of the basic substrate (800 $mm^3$), the 32 dead-end well compartments 22 (107 $mm^3$)/32 processing compartments 221 (57 $mm^3$) show a percentage of approximately 7% or less in relation to the volume of the basic substrate 11. Such an arrangement is in particular suitable for conducting simultaneous PCR analysis on multiple sample aliquots.

Figure 2E:
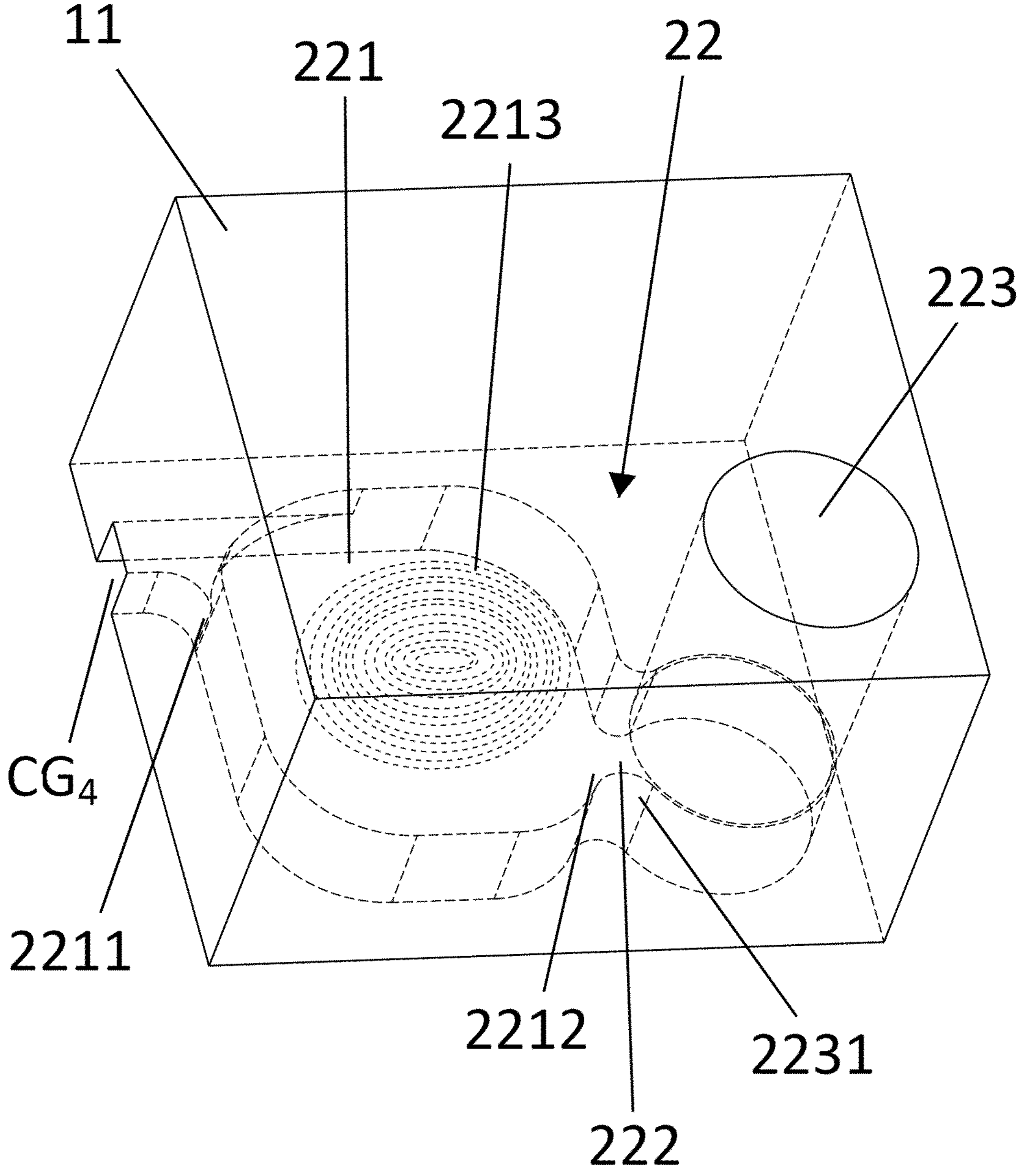
FIG. 2E represents a simplified perspective top view of part of a basic substrate in the area of a dead-end well compartment.
Figure 2F:
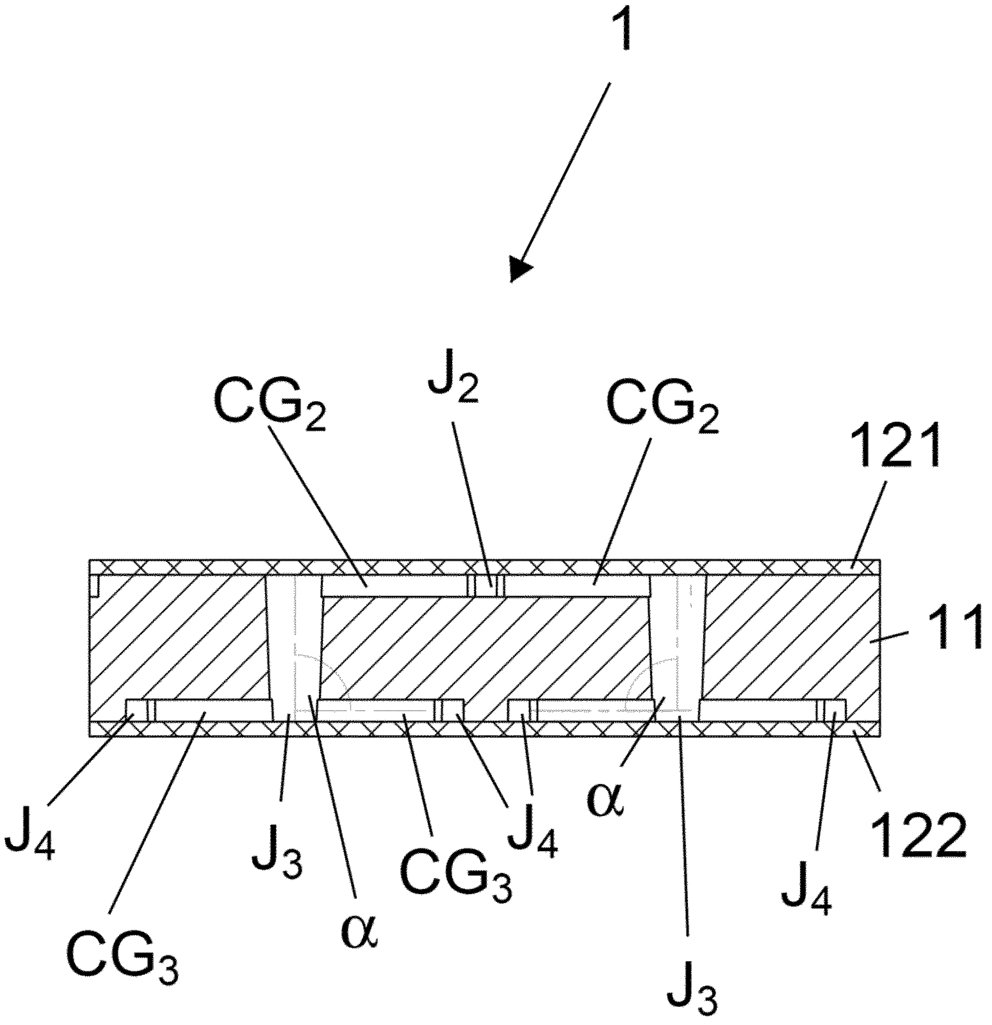
FIG. 2F represents a simplified cross section side view in plane B-B of part of microfluidic chip in the area of junctions $J_2$ and $J_3$.

FIG. 2E represents a simplified perspective view displaying in transmission a part of the basic substrate 11, which comprises part of the microfluidic network 2 with part of the sub-channel $CG_4$ connecting to the inlet 2211 of the processing compartment 221 having a cuboid shape with rounded corners in the plane of the lower surface. The rounded corners reduce the risk of maintaining residual gas in the processing compartments 221, which could have a negative impact on processing of the aliquot of liquid composition.

The processing compartment 221 is connected via an outlet opening 2212 to the compression channel 222, both the processing compartment 221 and the compression channel 222 respectively formed as a recess into the lower surface of the basic substrate. The recess of the processing compartment 221 comprises in central position and separated from the inlet opening 2212 and the outlet opening 2213 a matte structured surface 2213. The compression channel 222 connects to an inlet opening 2231 of the compression compartment 223, which is arranged as cylindrical or conical through-hole through the basic substrate 11 as described hereinbefore.

All of the features disclosed with respect to the accompanying figures can alone or in any sub-combination be combined with features of the three aspects of the present invention including features of preferred embodiments thereof, provided the resulting feature combination is reasonable to a person skilled in the art.

REFERENCE NUMERALS

1 Inventive microfluidic chip for partitioning a liquid composition into multiple aliquots of liquid composition having the same volume and constitution
11 basic substrate
121 coating material in form of a foil applied to upper surface of the basic substrate
122 coating material in form of a foil applied to lower surface of the basic substrate unvented microfluidic network
21 microfluidic channel
210 inlet port to microfluidic channel 21
211 downstream sub-channel of a given generation
22 dead-end well compartment
221 processing compartment
2211 inlet of processing compartment
2212 outlet of processing compartment
2213 matte structure of processing compartment
222 compression channel
223 compression compartment
2231 inlet of compression compartment
$J_1$ junction branching the microfluidic channel into two or more downstream sub-channels of a first generation
$J_2$ junction branching the microfluidic channel into two or more downstream sub-channels of a second generation
$J_3$ junction branching the microfluidic channel into two or more downstream sub-channels of a third generation
$J_4$ junction branching the microfluidic channel into two or more downstream sub-channels of a fourth generation
$CG_1$ downstream sub-channel of a first generation
$CG_2$ downstream sub-channel of a second generation
$CG_3$ downstream sub-channel of a third generation
$CG_4$ downstream sub-channel of a fourth generation
$CG_L$ downstream sub-channel of last generation
S section where the microfluidic channel changes plane without branching the microfluidic channel into two or more downstream sub-channels
A cross section plane in the inventive microfluidic chip in the area of the first junction $J_1$ branching the microfluidic channel into four downstream sub-channels of the first generation $CG_1$
F cross section plane in the inventive microfluidic chip in the area of dead-end well compartments
B cross section plane in the inventive microfluidic chip in the area of junction $J_2$
$\alpha$ intersection angle $\alpha$ at a junction $J_g$

The invention claimed is:

1. A microfluidic chip for partitioning a liquid composition into multiple aliquots comprising a substrate with a fluid inlet port, and an unvented microfluidic network connected to the fluid inlet port, wherein the unvented microfluidic network comprises a microfluidic channel, which is branched at a first junction $J_i$ with i=1 into two or more downstream sub-channels of a corresponding first generation $CG_i$ with i=1 and each of the two or more downstream sub-channels of the first generation is independent from each other and subsequently branched at a second or further subsequent one or more junctions $J_i$ with i=2, 3 or more into two or more downstream sub-channels of a corresponding second or subsequent further generation $CG_i$ with i=2, 3 or more, wherein each of the downstream sub-channels of the respective last generation $CG_L$ is connected to an inlet of a dead-end well compartment for processing the aliquot of the liquid composition in operation, and wherein at a given junction $J_g$ each of the directly connected downstream sub-channels of the corresponding given generation $CG_g$ together with its subsequent downstream sub-channels of subsequent further generations $CG_i$ with i=g+1 or more if present and its respectively connected one or more dead-end well compartments form a respective downstream microfluidic network sub-part of the corresponding given generation $MN_g$ with a respective volume $VMN_g$, wherein the microfluidic network is configured in such a way that at each of the one or more junctions $J_i$ the respective volume $VMN_g$ of each downstream microfluidic network sub-part of the same given generation $MN_g$ is directly proportional ±5 Vol. % to the total number of dead-end well compartments comprised in the respective downstream microfluidic network sub-part, and wherein the microfluidic network comprises gas, which will be compressed during operation of the microfluidic chip, and wherein each of the multiple dead-end well compartments comprises a processing compartment, a compression compartment, and optionally a compression channel, wherein the inlet of the dead-end well compartment forms the inlet of the processing compartment connected to the downstream sub-channel of the respective last generation $CG_L$, wherein the processing compartment further comprises an outlet, which is connected either to an inlet of the compression compartment or wherein in case the compression channel is present, the outlet of the processing compartment is connected to the compression channel, which is connected to the inlet of the compression compartment, with the proviso that at least one processing compartment is positioned at a different distance from the center point of the microfluidic chip than at least one other processing compartment such that the microfluidic chip cannot be operated in rotation.

2. The microfluidic chip according to claim 1, wherein each of the downstream sub-channels $CG_g$ independently of each other exhibits a hydraulic diameter D, defined as D=4A/p, where A is the cross-sectional area of the respective sub-channel and p is the cross-section perimeter, of 600 μm or less, and a fluidic distance in the direction of flow between two consecutive given junctions $J_g$ and $J_{g+1}$ of at least three times the hydraulic diameter.

3. The microfluidic chip according to claim 1, wherein the two or more sub-channels of the corresponding given generation $CG_g$ connecting to a given junction $J_g$ are arranged within the microfluidic chip in a plane parallel to either an upper or a lower surface of the microfluidic chip and at least the part of the microfluidic channel connecting upstream to the given junction $J_g$ is arranged within the microfluidic chip perpendicular to the plane of the sub-channels of the corresponding given generation $CG_g$.

4. The microfluidic chip according to claim 3, wherein the microfluidic channel connecting upstream to the given junction $J_g$ and arranged perpendicular to the plane of the sub-channels of the corresponding given generation $CG_g$ bends further upstream at a section S into a plane parallel to and spaced from the plane of the sub-channels of the corresponding given generation $CG_g$.

5. The microfluidic chip according to claim 1, wherein the inlet and the outlet of the processing compartment are configured in such a way that when operating the microfluidic chip the processing compartment can be entirely filled with the aliquot of liquid composition and wherein the compression compartment is configured to encase the respective compressed gas portion.

6. The microfluidic chip according to claim 1, wherein the compression compartment is configured to not interfere with processing of the liquid composition in the processing compartment when operating the microfluidic chip.

7. The microfluidic chip according to claim 1, wherein a part of the inner surface of the processing compartment comprises a matte surface structure configured to attach an applied agent and configured to be in contact with the aliquot liquid composition when in operation.

8. The microfluidic chip according to claim 1, wherein the microfluidic chip comprises a basic substrate having in parallel an upper and a lower surface, wherein at least at a given junction $J_g$ where the microfluidic channel is branched in two or more downstream sub-channels of the given generation $CG_g$, each of the downstream sub-channels of the given generation $CG_g$ is arranged as a recess either in the upper or the lower surface of the basic substrate and the microfluidic channel connecting upstream to the given junction $J_g$ forms a through-hole perpendicular to the upper and lower surface of the basic substrate and connects at the given junction $J_g$ to each of the downstream sub-channels of the given generation $CG_g$, and wherein the basic substrate is coated on the upper and lower surfaces at least in the surface area comprising the downstream sub-channels of the given generation $CG_g$ and the microfluidic channel connecting upstream to the given junction $J_g$ with a coating material thereby forming the unvented microfluidic network of the microfluidic chip.

9. The microfluidic chip according to claim 8, wherein the multiple dead-end well compartments are respectively arranged as a recess in the lower surface of the basic substrate, the compression compartments respectively extend perpendicular to the upper and lower surface of the basic substrate, and wherein the basic substrate is coated on the upper and lower surface at least in the surface area comprising the processing compartment, the compression channel and the through-hole compression compartment with the coating material thereby forming the unvented microfluidic network of the microfluidic chip.

10. The microfluidic chip according to claim 1, wherein each of the downstream sub-channels $CG_g$ independently of each other exhibits a hydraulic diameter D, defined as D=4A/p, where A is the cross-sectional area of the respective sub-channel and p is the cross-section perimeter, in the range of 500 μm to 100 μm, and a fluidic distance in the direction of flow between two consecutive given junctions $J_g$ and $J_g$+1 in the range of five times the hydraulic diameter to twenty five times the hydraulic diameter.

11. The microfluidic chip according to claim 1, wherein the two or more sub-channels of the corresponding given generation $CG_g$ connecting to a given junction $J_g$ are arranged within the microfluidic chip in a plane parallel to either an upper or a lower surface of the microfluidic chip and at least the part of the microfluidic channel connecting upstream to the given junction $J_g$ is arranged within the microfluidic chip perpendicular to the plane of the sub-channels of the corresponding given generation $CG_g$.

12. The microfluidic chip according to claim 11, wherein the microfluidic channel connecting upstream to the given junction $J_g$ and arranged perpendicular to the plane of the sub-channels of the corresponding given generation $CG_g$ bends further upstream at a section S into a plane parallel to and spaced from the plane of the sub-channels of the corresponding given generation $CG_g$.

13. The microfluidic chip according to claim 1, wherein the microfluidic channel is branched at least at one of the junctions $J_i$, into three or more downstream sub-channels of the corresponding generation $CG_i$.

14. The microfluidic chip according to claim 1, wherein each of the compression compartments exhibits the same volume.

15. The microfluidic chip according to claim 7, wherein the matte surface structure is arranged in central position of the surface so that at least the surface area around the inlet and outlet of the processing compartment does not comprise the matte surface structure.

16. The microfluidic chip according to claim 8, wherein the microfluidic channel bends at a section S on the surface of the basic substrate opposite to the downstream sub-channels of the given generation $CG_g$ in such a way that it is further arranged in this surface of the basic substrate.

17. A process for producing the microfluidic chip as claimed in claim 1, wherein the process comprises the following steps:

a) producing a basic substrate having in parallel an upper and a lower surface further comprising a microfluidic network as defined in claim 1, wherein at least at a given junction $J_g$ where the microfluidic channel is branched in two or more downstream sub-channels of the corresponding given generation $CG_g$, i. arranging each of the downstream sub-channels of the given generation $CG_g$ respectively as a recess either in the upper or the lower surface of the basic substrate; and ii. arranging the microfluidic channel connecting upstream to the given junction $J_g$ as a through-hole perpendicular to the upper and lower surfaces of the basic substrate and connecting it at the given junction $J_g$ to each of the downstream sub-channels of the given generation $CG_g$, iii. arranging the multiple dead-end well compartments respectively as a recess in the lower surface of the basic substrate and wherein the compression compartments respectively extend perpendicular to the upper and lower surface of the basic substrate; and b) coating the upper and lower surfaces of the basic substrate of step a) at least in the surface area comprising the downstream sub-channels of the given generation $CG_g$ and the microfluidic channel connecting upstream to the given junction $J_g$ with a coating material, and wherein the coating material is further applied at least in the surface area comprising the dead-end well compartments, thereby forming an unvented microfluidic network of the microfluidic chip.

18. The process for producing the microfluidic chip according to claim 17, wherein producing the basic substrate according to step a) further comprises arranging in case the multiple dead-end well compartments respectively comprise a processing compartment, a compression compartment and a compression channel—the processing compartments and the compression channels are respectively as a recess in the lower surface of the basic substrate, and wherein the compression compartments are respectively formed as a through-hole perpendicular to the upper and lower surfaces of the basic substrate and wherein in step b) the coating material is further applied at least in the surface area comprising the dead-end well compartments respectively including the processing compartment, the compression channel and the through-hole compression compartment thereby forming the unvented microfluidic network of the microfluidic chip.

19. The process for producing the microfluidic chip according to claim 17, wherein step a) comprises injection molding of a polymeric substrate wherein the injection molded polymeric substrate forming the microfluidic chip does not interfere with processing of the aliquot of liquid composition.

20. A method for partitioning a liquid composition into multiple aliquots, wherein the partitioned multiple aliquots exhibit the same volume and the same constitution, comprising:

providing a microfluidic chip as claimed in claim 1, providing a reservoir comprising a liquid composition to be partitioned, wherein the reservoir is connected via the fluid inlet port with the microfluidic network of the microfluidic chip, partitioning the liquid composition into aliquots of the same volume and the same constitution by applying pressure to the liquid composition, with the proviso that the pressure is not applied by rotating the microfluidic chip, thereby transferring the aliquots of the liquid composition via the fluid inlet port and the unvented microfluidic network to the respective processing compartments of the dead-end well compartments.

* * * * *